US011967158B2

(12) United States Patent
Kaneko et al.

(10) Patent No.: US 11,967,158 B2
(45) Date of Patent: Apr. 23, 2024

(54) IMAGE PROCESSOR AND IMAGE PROCESSING METHOD

(71) Applicant: Faurecia Clarion Electronics Co., Ltd., Saitama (JP)

(72) Inventors: Takayuki Kaneko, Saitama (JP); Yousuke Haga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 259 days.

(21) Appl. No.: 17/318,183

(22) Filed: May 12, 2021

(65) Prior Publication Data
US 2021/0357666 A1 Nov. 18, 2021

(30) Foreign Application Priority Data

May 12, 2020 (JP) ................................. 2020-084007

(51) Int. Cl.
*G06K 9/00* (2022.01)
*B60R 1/00* (2022.01)
(Continued)

(52) U.S. Cl.
CPC .............. *G06V 20/586* (2022.01); *B60R 1/00* (2013.01); *G06V 10/44* (2022.01); *G06V 10/50* (2022.01);
(Continued)

(58) Field of Classification Search
CPC ................ B60R 1/00; B60R 2300/307; B60R 2300/806; G06V 10/44
See application file for complete search history.

(56) References Cited

U.S. PATENT DOCUMENTS

| 6,285,297 B1 * | 9/2001 | Ball | G08G 1/146 340/932.2 |
| 10,703,360 B2 * | 7/2020 | Kojo | G01S 13/931 |

(Continued)

FOREIGN PATENT DOCUMENTS

| CN | 107054466 A | * 8/2017 | ............. B60Q 9/002 |
| EP | 1094337 A2 | * 4/2001 | ............. B60Q 9/005 |

(Continued)

OTHER PUBLICATIONS

Stereo Vision Based Localization of Free Parking Site, Ho Gi Jung et al., Springer, 2005, pp. 231-239 (Year: 2005).*

(Continued)

*Primary Examiner* — Jayesh A Patel
(74) *Attorney, Agent, or Firm* — Wenderoth, Lind & Ponack, L.L.P.

(57) ABSTRACT

An image processor includes a boundary line detection portion configured to detect a boundary line by using an image in accordance with an image signal acquired by an imaging device, a parking frame detection portion configured to detect a parking frame by using the detected boundary line, an in-frame scanning portion configured to acquire a dividing point that divides a pair of facing sides of the boundary lines that define the parking frame and to scan the image through the dividing point to detect an edge, a storage portion configured to store a state of an edge and an attribute of the parking frame by linking them, and a determination portion configured to determine an attribute of the parking frame by using a state of the detected edge and the stored attribute of the parking frame that is linked to the state of the edge stored in the storage portion.

8 Claims, 12 Drawing Sheets

(51) Int. Cl.
*G06V 10/44* (2022.01)
*G06V 10/50* (2022.01)
*G06V 20/58* (2022.01)
*B60W 30/06* (2006.01)

(52) U.S. Cl.
CPC ... *B60R 2300/307* (2013.01); *B60R 2300/806* (2013.01); *B60W 30/06* (2013.01); *B60W 2420/42* (2013.01)

(56) References Cited

U.S. PATENT DOCUMENTS

| | | | | |
|---|---|---|---|---|
| 10,839,686 | B2* | 11/2020 | Wunder | G06Q 50/10 |
| 11,443,555 | B2* | 9/2022 | Sriram | G06V 10/147 |
| 2013/0021171 | A1* | 1/2013 | Hsu | B62B 15/0285 |
| | | | | 340/932.2 |
| 2014/0163862 | A1* | 6/2014 | Choi | B62D 15/028 |
| | | | | 701/400 |
| 2015/0009048 | A1* | 1/2015 | Wang | G08B 1/144 |
| | | | | 340/932.2 |
| 2015/0063646 | A1* | 3/2015 | Wang | G06V 20/586 |
| | | | | 382/104 |
| 2015/0097956 | A1* | 4/2015 | Torii | G06V 20/586 |
| | | | | 348/148 |
| 2015/0371541 | A1* | 12/2015 | Korman | G08G 1/147 |
| | | | | 340/932.2 |
| 2016/0110619 | A1* | 4/2016 | Kim | B60R 11/04 |
| | | | | 382/104 |
| 2016/0307039 | A1* | 10/2016 | Krishnamoorthy | H04L 67/12 |
| 2016/0307047 | A1* | 10/2016 | Krishnamoorthy | |
| | | | | G06Q 30/0185 |
| 2018/0130351 | A1* | 5/2018 | Ha | G06Q 10/02 |
| 2018/0322349 | A1* | 11/2018 | Hayakawa | G06V 20/586 |
| 2019/0304123 | A1* | 10/2019 | Iwai | G06T 7/55 |
| 2020/0062242 | A1* | 2/2020 | Hayakawa | G08G 1/168 |
| 2020/0079359 | A1 | 3/2020 | Tsujino et al. | |
| 2020/0193189 | A1* | 6/2020 | Okada | G06V 10/443 |
| 2020/0193193 | A1* | 6/2020 | Okada | G06V 20/586 |
| 2020/0207416 | A1* | 7/2020 | Tsunekazu | B62D 15/0275 |
| 2020/0311961 | A1* | 10/2020 | Morinaga | B60R 11/04 |
| 2020/0334474 | A1* | 10/2020 | Kaneko | G06T 7/62 |
| 2020/0369204 | A1* | 11/2020 | Suzuki | B62D 15/0285 |
| 2020/0398826 | A1* | 12/2020 | Tsujino | B60R 1/27 |
| 2021/0064892 | A1* | 3/2021 | Adelsberger | G06V 20/17 |

FOREIGN PATENT DOCUMENTS

| | | | | |
|---|---|---|---|---|
| EP | 3731138 | A1 * | 10/2020 | ............ B60R 11/04 |
| JP | 3-99952 | | 4/1991 | |
| JP | 6-258046 | | 9/1994 | |
| JP | 2003-118522 | | 4/2003 | |
| JP | 2007-052730 | | 3/2007 | |
| JP | 2009205191 | A * | 9/2009 | |
| JP | 2013154730 | A * | 8/2013 | |
| JP | 2017-21747 | | 1/2017 | |
| JP | 2017021747 | A * | 1/2017 | |
| JP | 2019-128607 | | 8/2019 | |
| JP | 2020-40441 | | 3/2020 | |
| KR | 20150028492 | A * | 3/2015 | |
| WO | WO-2013088431 | A * | 6/2013 | ............ G08G 1/143 |
| WO | WO-2013088431 | A1 * | 6/2013 | ............ G08G 1/143 |
| WO | WO-2018186253 | A1 * | 10/2018 | ......... B62D 15/0285 |

OTHER PUBLICATIONS

QuickSpot: a video analytics solution for on-street vacant parking spot detection, Elena Marmol et al, Springer, 2016, pp. 17711-17743 (Year: 2016).*
Intelligent Parking Space Detection System Based on Image Processing, R. Yusnita et al., IJOIMT, 2012, pp. 232-235 (Year: 2012).*
Deep-Learning Based Vehicle Count and Free Parking Slot Detection System, Gulraiz Khan et al, IEEE, 2019, pp. 1-7 (Year: 2019).*
Autonomous Parking from a Random Drop Point, Seong-Woo Kim et al., IEEE, 2014, pp. 498-503 (Year: 2014).*
Autonomous Driving in a Multi-level Parking Structure, Rainer Kummerle et al., IEEE, 2009, pp. 3395-3400 (Year: 2009).*
An End-to-End Fully Automatic Bay Parking Approach for Autonomous Vehicles, Rui Li et al, ASME, 2018, pp. 1-8 (Year: 2018).*
Parking Space Detection From Video by Augmenting Training Dataset, Wei Yu et al., IEEE, 2009, pp. 849-852 (Year: 2009).*
Stereo Vision Based Localization of Free Parking Site, Ho Gi Jung et al., Spriner, 2005, pp. 231-239 (Year: 2005).*
Video-based real-time on-street parking occupancy detection system, Orhan Bulan et al., SPIE, 2013, pp. 041109-1 to 041109-15 (Year: 2013).*
QuickSpot: a video analytics solution for on-street vacant parking spot detection, Elena Marmol et al, Springer, 2016, pp. 17711-17743 (Year: 2016).*
Intelligent Parking Spot Detection System Based on Image Processing, R. Yusnita et al, IJOIMT, pp. 232-235 (Year: 2012).*
Office Action issued Jan. 16, 2024 in corresponding Japanese Patent Application No. 2020-084007 with English-lanange translation.

* cited by examiner

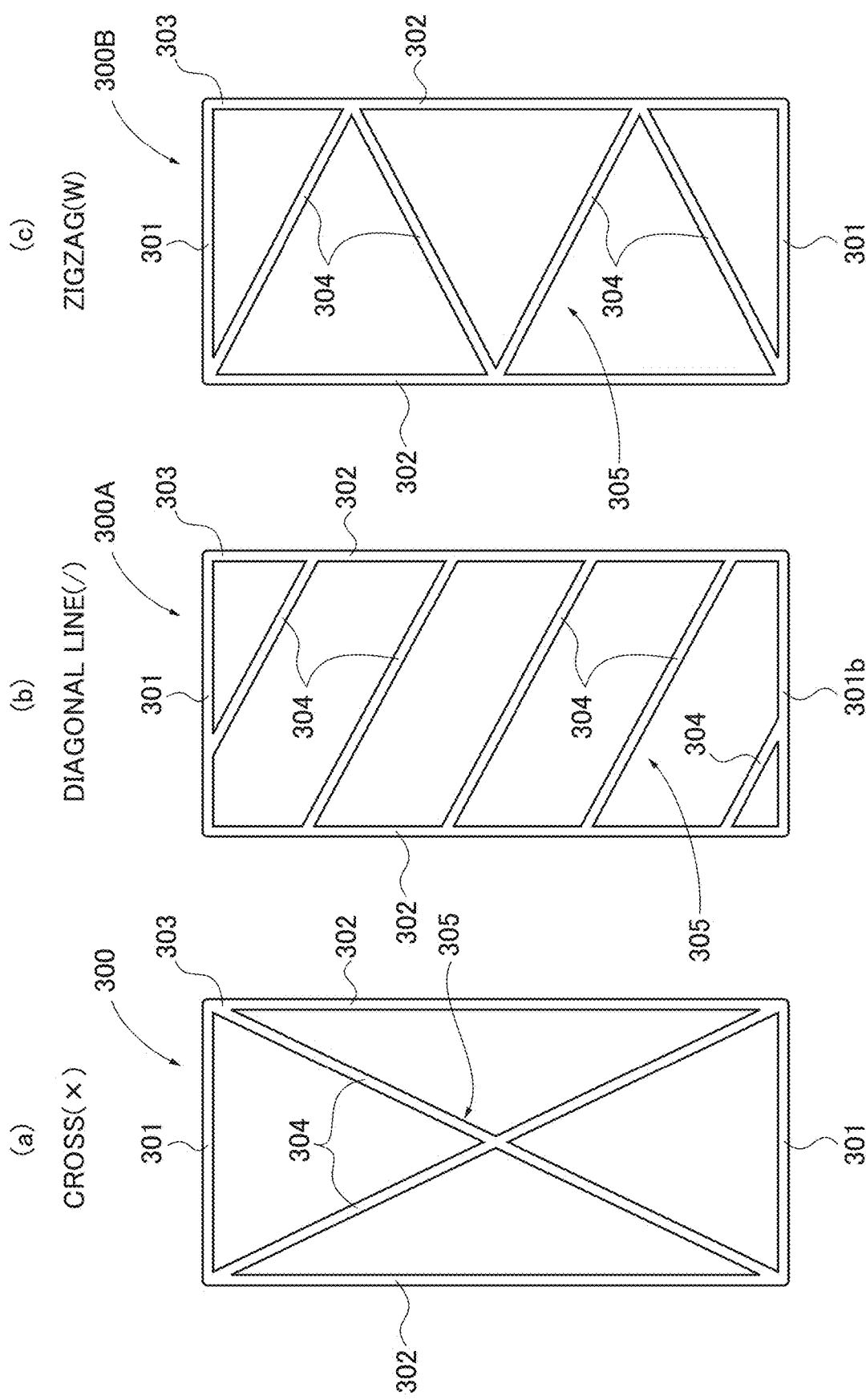

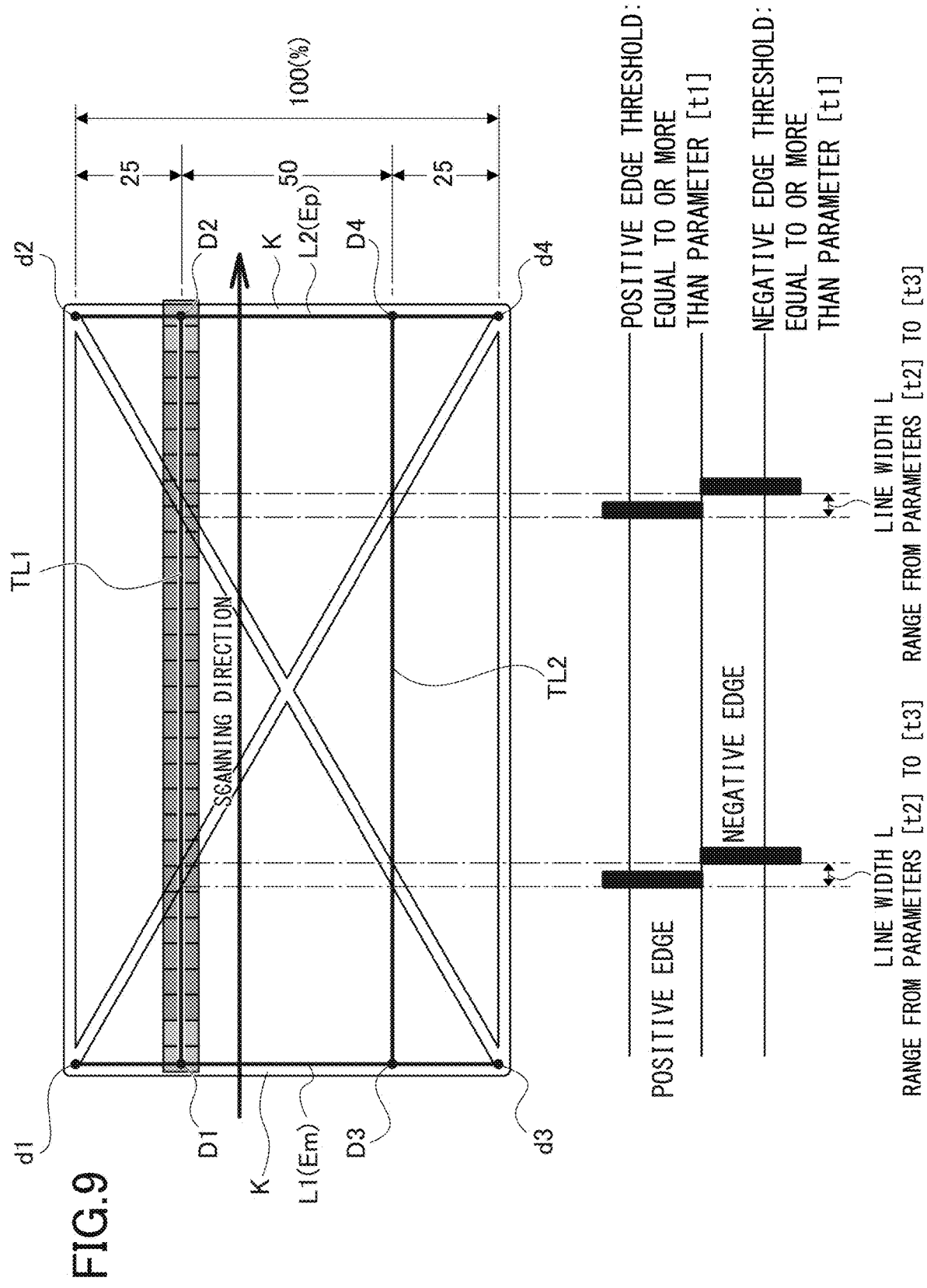

FIG.11

PARAMETER DATA 122
SEARCH PARAMETER TABLE 122a

| NO. | SEARCH PARAMETER |
|---|---|
| 1 | t1(90[pix]) |
| 2 | t2(5[pix]) |
| 3 | t3(23[pix]) |

STATE DETERMINATION PARAMETER TABLE 122b

| NO. | STATE DETERMINATION PARAMETER |
|---|---|
| 1 | s1(6[pix]) |
| 2 | s2(2[lines]) |
| 3 | s3(3[lines]) |
| 4 | s4(4[lines]) |
| 5 | s5(38[pix]) |
| 6 | s6(3[pix]) |

CONDITION DATA 123
CONDITION DATA TABLE 123a

| NO. | CONDITIONS | CONDITIONAL EXPRESSIONS FOR MARKER TYPES | | | ... | SIGN MARK |
| --- | --- | --- | --- | --- | --- | --- |
| | | FIRST PARKING PROHIBITION MARKER CROSS (×) | SECOND PARKING PROHIBITION MARKER DIAGONAL LINE (/) | THIRD PARKING PROHIBITION MARKER ZIGZAG (W) | | |
| 1 | LINE WIDTH DIFFERENCE ($\Delta L$) | $\Delta L \geq s1$ (PARAMETER 1) | — | — | ... | — |
| 2 | LINE NUMBERS (N) | $N = s2$ (PARAMETER 2) | $N = s3$ (PARAMETER 3) or $N = s4$ (PARAMETER 4) | $N = s4$ (PARAMETER 4) | ... | — |
| 3 | LINE SPACING (W) OR LINE SPACING DIFFERENCE ($\Delta W$) | $W > s5$ (PARAMETER 5) | $\Delta W < s6$ (PARAMETER 6) | $\Delta W \geq s6$ (PARAMETER 6) | ... | — |

FIG.12
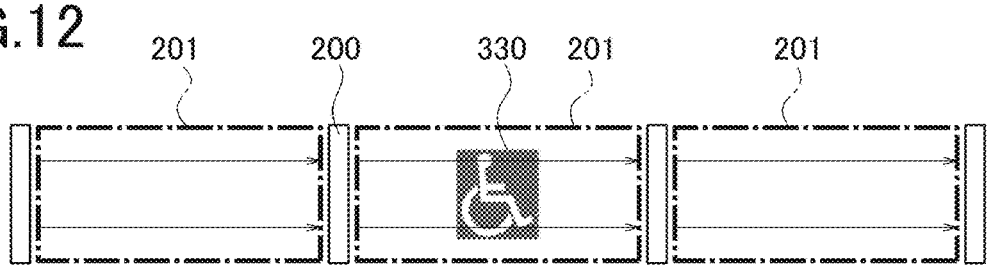
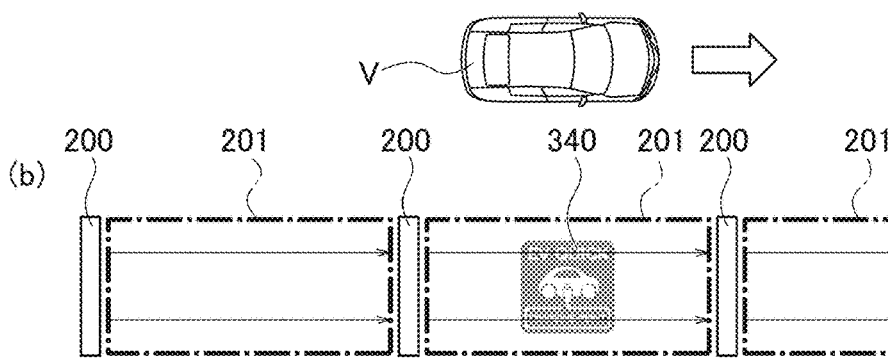
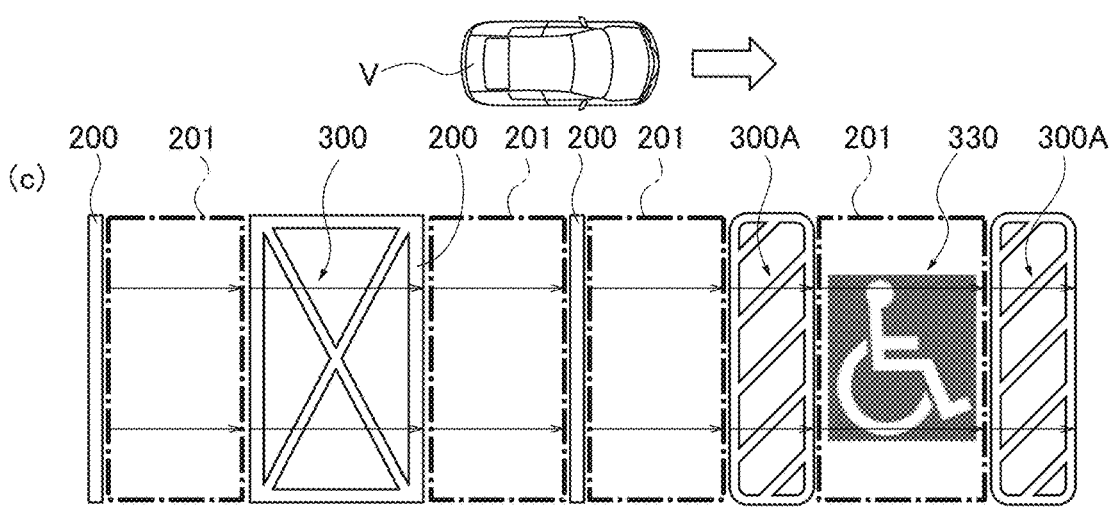
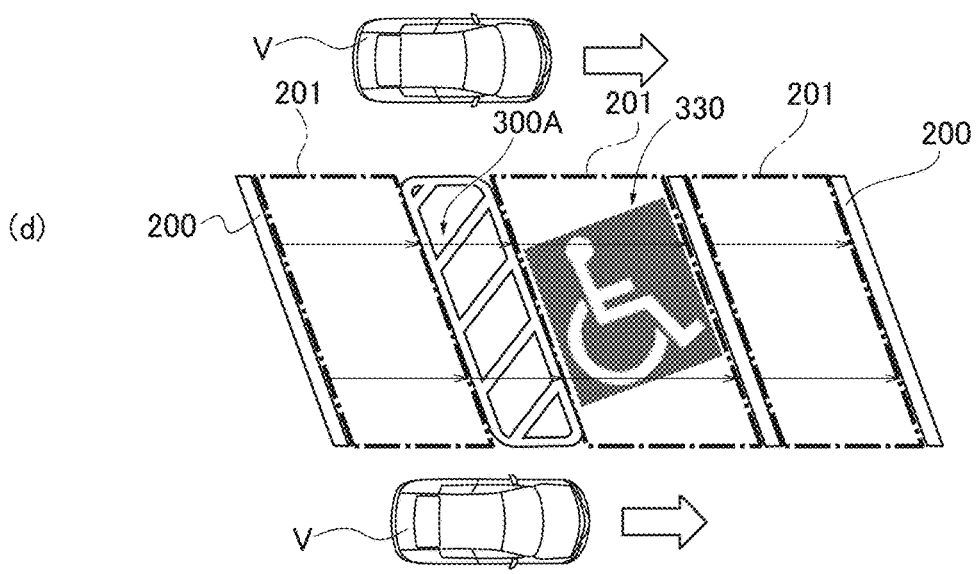

IMAGE PROCESSOR AND IMAGE PROCESSING METHOD

CROSS-REFERENCE TO RELATED APPLICATION

The present application is based on and claims priority from Japanese patent application No. 2020-084007 filed on May 12, 2020, the disclosure of which is hereby incorporated by reference in its entirety.

FIELD OF THE INVENTION

A present disclosure relates to an image processor and an image processing method that estimate a parking frame based on an image signal output from an imaging device that captures surroundings of a vehicle.

BACKGROUND

A parking assist device has been used to assist the parking of a vehicle by automatically detecting a target parking frame upon parking the vehicle in a predetermined parking space (see JP2017-21747A, for example). The device disclosed in JP2017-21747A detects a parking frame from an image captured by an imaging device and assists the parking in accordance with the attribute (e.g., shape) of the detected parking frame.

In addition to a normal parking frame where anybody can park the vehicle, there are various types of areas or frames such as a parking prohibition area where the vehicles are not allowed to enter and park, a priority parking frame for a wheelchair user or the like, and an electric vehicle parking frame for charging the electric vehicle, for example. Accordingly, it has been desired that appropriate parking assist corresponding to the types (attributes) of the parking frame is achieved. However, the prior art does not disclose the detection of the parking frame by considering the attributes of such parking frames.

Therefore, an object of the present disclosure is to provide an image processor and an image processing method capable of detecting a parking frame in accordance with the attribute of the parking frame.

SUMMARY

An image processor includes a boundary line detection portion configured to detect a boundary line by using an image in accordance with an image signal acquired by an imaging device that captures a surrounding of a vehicle, a parking frame detection portion configured to detect a parking frame by using the detected boundary line, an in-frame scanning portion configured to acquire a dividing point that divides, at a predetermined rate, a pair of facing sides of the boundary lines that define the parking frame and to scan the image through the acquired dividing point to detect an edge, a storage portion configured to store a state of an edge and an attribute of the parking frame by linking them, and a determination portion configured to determine an attribute of the parking frame by using a state of the detected edge and the stored attribute of the parking frame that is linked to the state of the edge stored in the storage portion.

An image processing method includes detecting a boundary line by using an image in accordance with an image signal acquired by an imaging device that captures a surrounding of a vehicle, detecting a parking frame by using the detected boundary line, acquiring a dividing point that divides, at a predetermined rate, a pair of facing sides of the boundary lines that define the parking frame and scanning the image through the acquired dividing point to detect an edge, storing a state of an edge and an attribute of the parking frame by linking them, and determining an attribute of the parking frame by using a state of the detected edge and the stored attribute of the parking frame that is linked to the state of the edge stored in the storage portion.

BRIEF DESCRIPTION OF DRAWINGS

FIG. 8 is a view illustrating an example of the operation of the image processor, sections (a) to (c) showing examples of first to third parking prohibition markers, respectively.

FIG. 9 is a view illustrating a process for scanning the parking frame by a parking frame scanning portion to describe an example of the operation of the image processor.

FIG. 11 is a view illustrating the data structure of parameter data to describe an example of the operation of the image processor.

FIG. 12 is a view illustrating parking lots including parking frames with different attributes and conditions, (a) showing an example of a parking lot including a priority parking frame for parallel parking, (b) showing an example of a parking lot including an electric vehicle parking frame for parallel parking, (c) showing an example of a parking lot including the priority parking frame and a parking prohibition area for perpendicular parking, and (d) showing an example of a parking lot including the parking prohibition area and the priority parking frame for angle parking.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
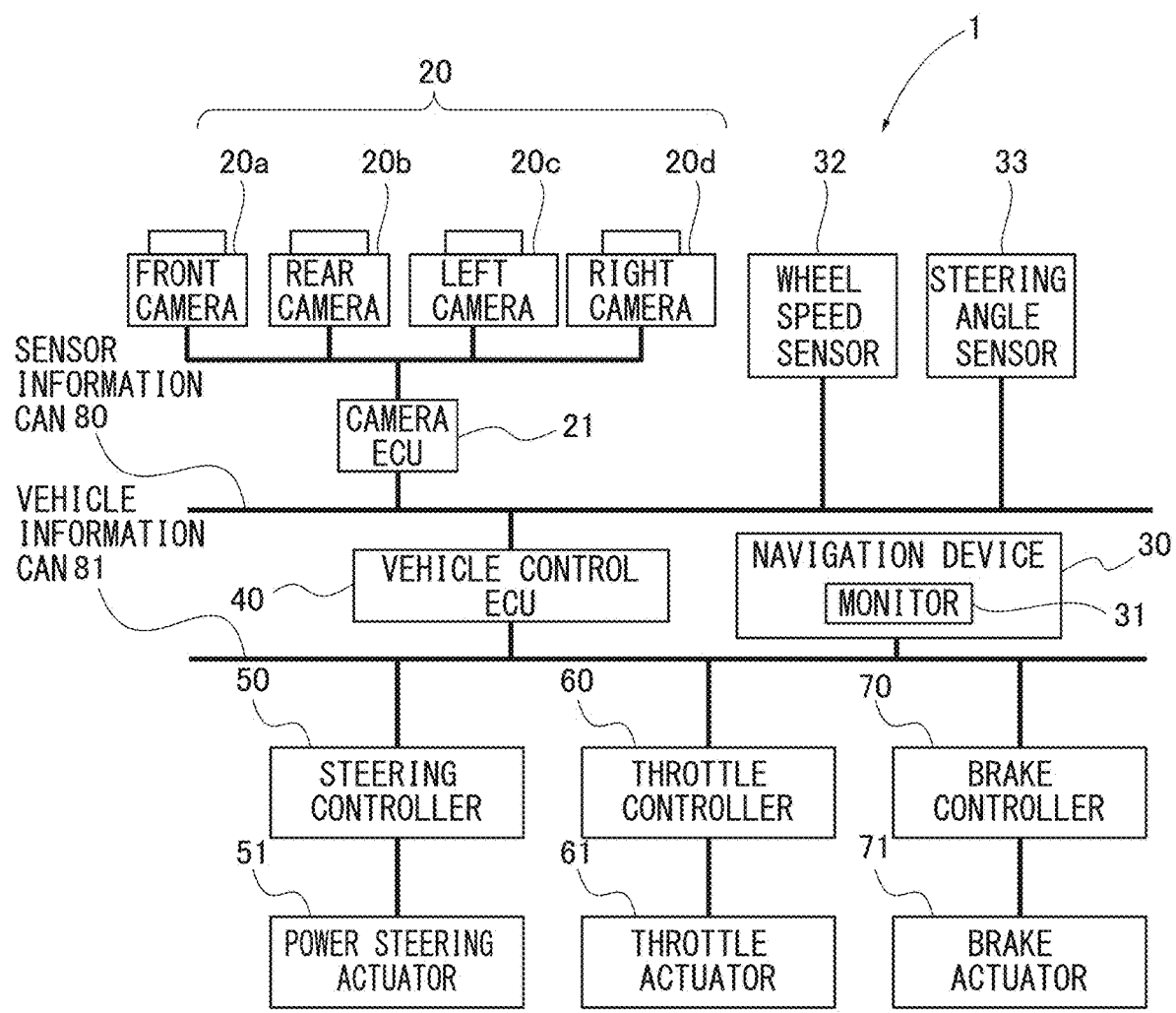
FIG. 1 is a block diagram illustrating a schematic configuration of a parking assist device to which an image processor of an embodiment of the present disclosure is applied.
Figure 2:
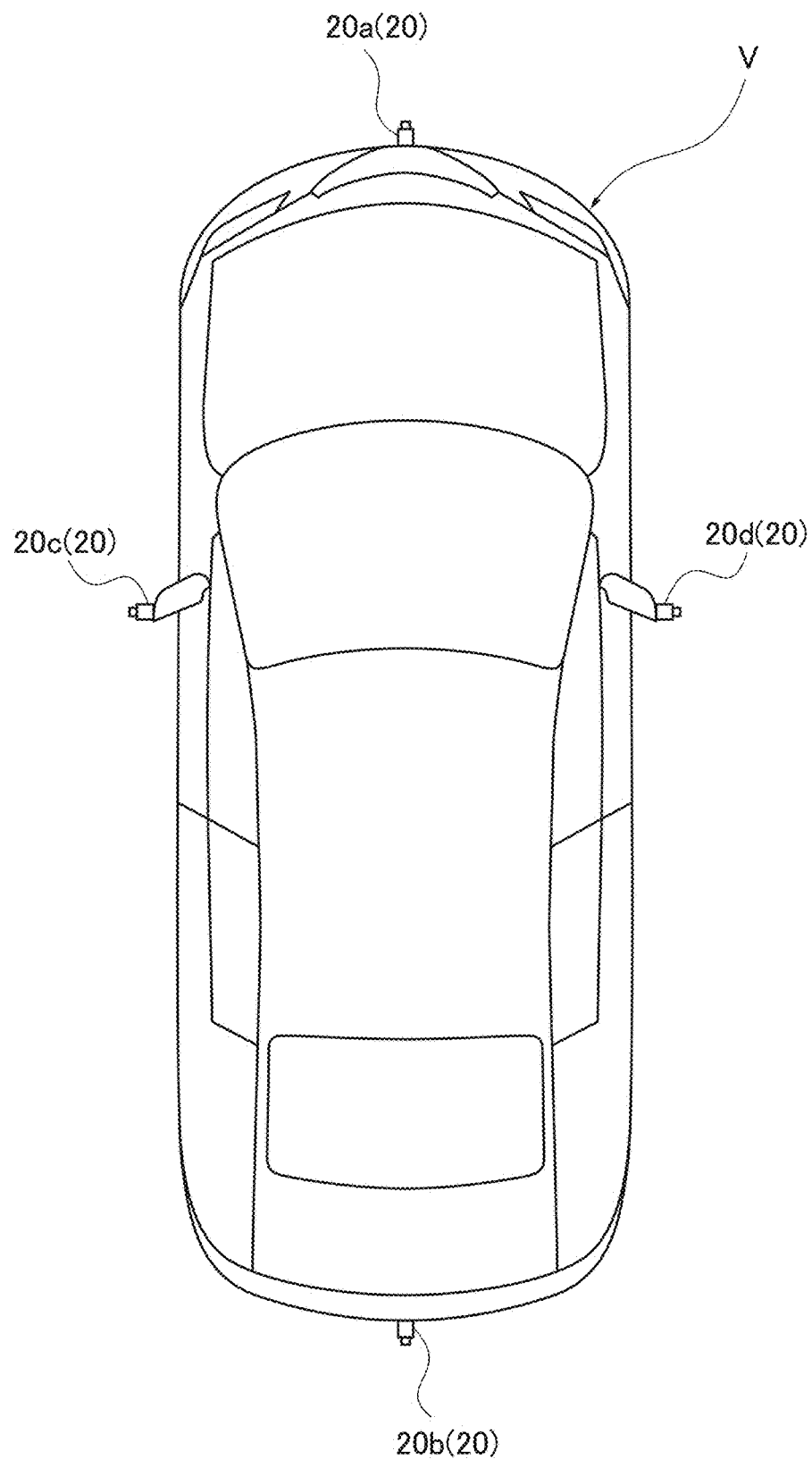
FIG. 2 is a view illustrating an example of positions of imaging devices of the parking assist device of the embodiment.

Hereinafter, embodiments of the present disclosure will be described with reference to the accompanying drawings. FIG. 1 is a block diagram illustrating a schematic configuration of a parking assist device to which an image processor according to an embodiment of the present disclosure is applied. FIG. 2 is a view illustrating an example of positions of imaging devices of the parking assist device.

As shown in FIG. 1, a vehicle V (see FIG. 2) is provided with a parking assist device 1 that performs a parking assist operation. More specifically, the parking assist device 1 is configured to recognize parking frames in which the vehicle V can be parked. The parking assist device 1 controls the vehicle V to be parked in the recognized parking frame.

As shown in FIG. 2, a plurality of small cameras (imaging devices) is mounted on the front, rear, right, and left portions of the vehicle V, respectively. More specifically, a front camera 20*a* is mounted on a front bumper or a front grille of the vehicle V to face the forward of the vehicle V. A rear camera 20*b* is mounted on a rear bumper or a rear garnish of the vehicle V to face the rear of the vehicle V. A left camera 20*c* is mounted on a left door mirror of the vehicle V to face the left side of the vehicle V. A right camera 20*d* is mounted on a right door mirror of the vehicle V to face the right side of the vehicle V.

Each of the front camera 20*a*, the rear camera 20*b*, the left camera 20*c*, and the right camera 20*d* is provided with a wide-angle lens or a fisheye lens for a wide range observation. A region including a road surface around the vehicle V can be completely observed by the four cameras 20*a* to 20*d*. The cameras 20*a* to 20*d* are the imaging devices that capture or image the surroundings around the vehicle V (road surface R around the vehicle V in the present disclosure). Hereinafter, the cameras (imaging devices) 20*a* to 20*d* are simply referred to as a camera 20 without distinguishing the respective cameras 20*a* to 20*d*.

As shown in FIG. 1, the parking assist device 1 includes the front camera 20*a*, the rear camera 20*b*, the left camera 20*c*, the right camera 20*d*, a camera ECU 21, a navigation device 30, a wheel speed sensor 32, and a steering angle sensor 33.

The camera ECU 21 includes a microcomputer as a main body that includes a Central Processing Unit (CPU) and memory including a Read-Only Storage portion (ROM), a Random Access Storage portion (RAM), a flash storage portion, or the like. The camera ECU 21 controls the camera 20. Also, the camera ECU 21 performs, by using information detected by the camera 20, a process for generating an overhead image, a process for detecting a parking frame, and a process for determining the attribute or type of the detected parking frame, and a process for determining whether or not the vehicle V can be parked in the detected parking frame.

The navigation device (display device) 30 includes a monitor 31 having an image display function. The navigation device 30 includes a storage portion that stores, for example, map data for guiding a route. The navigation device 30 shows a route to a destination set by an operator of the navigation device 30 based on the map data and a present position of the vehicle V detected by a GPS device (not shown), for example. Various images during a route guidance operation are displayed on the monitor 31.

The wheel speed sensor 32 detects the wheel speed of the vehicle V. The information (wheel speed) detected by the wheel speed sensor 32 is input to a vehicle control ECU 40.

The steering angle sensor 33 detects a steering angle of the vehicle V. The steering angle sensor 33 outputs a rotation angle from a neutral position (0 degrees) as the steering angle. The steering angle when the vehicle V travels straight is set as the neutral position (0 degrees). The information (steering angle) detected by the steering angle sensor 33 is input to the vehicle control ECU 40.

The parking assist device 1 further includes the vehicle control ECU 40, a steering controller 50, a throttle controller 60, and a brake controller 70.

The vehicle control ECU 40 includes a microcomputer as a main body that includes a Central Processing Unit (CPU), a Read-Only Storage portion (ROM), a Random Access Storage portion (RAM), and a flash storage portion. The vehicle control ECU 40 executes various processes that assist the parking of the vehicle V based on the various information input from the camera ECU 21, the wheel speed sensor 32, and the steering angle sensor 33.

More specifically, when a driver starts the parking assist device 1 by turning on an automatic parking start switch or button (not shown), for example, the vehicle control ECU 40 executes an automatic parking process for automatically parking the vehicle V in a parking frame determined as an available parking frame by the camera ECU 21 or a parking frame determined as an available parking frame by the vehicle control ECU 40 based on the parking frame detected by the camera ECU 21 and the attribute thereof.

The steering controller 50 controls the steering angle of the vehicle V by driving a power steering actuator 51 based on the vehicle control information determined by the vehicle control ECU 40.

The throttle controller 60 controls the throttle of the vehicle V by driving a throttle actuator 61 based on the vehicle control information determined by the vehicle control ECU 40.

The brake controller 70 controls the brake of the vehicle V by driving a brake actuator 71 based on the vehicle control information determined by the vehicle control ECU 40.

The camera ECU 21, the wheel speed sensor 32, the steering angle sensor 33, and the vehicle control ECU 40 are connected by a sensor information Controller Area Network (CAN) (registered trademark) 80 which is an interior Local Area Network (LAN).

The steering controller 50, the throttle controller 60, the brake controller 70, and the vehicle control ECU 40 are connected by a vehicle information CAN 81 which is the interior LAN.

In the parking assist device 1 having the above configuration, an image processor 100 of the embodiment includes the camera ECU 21.

Figure 3:
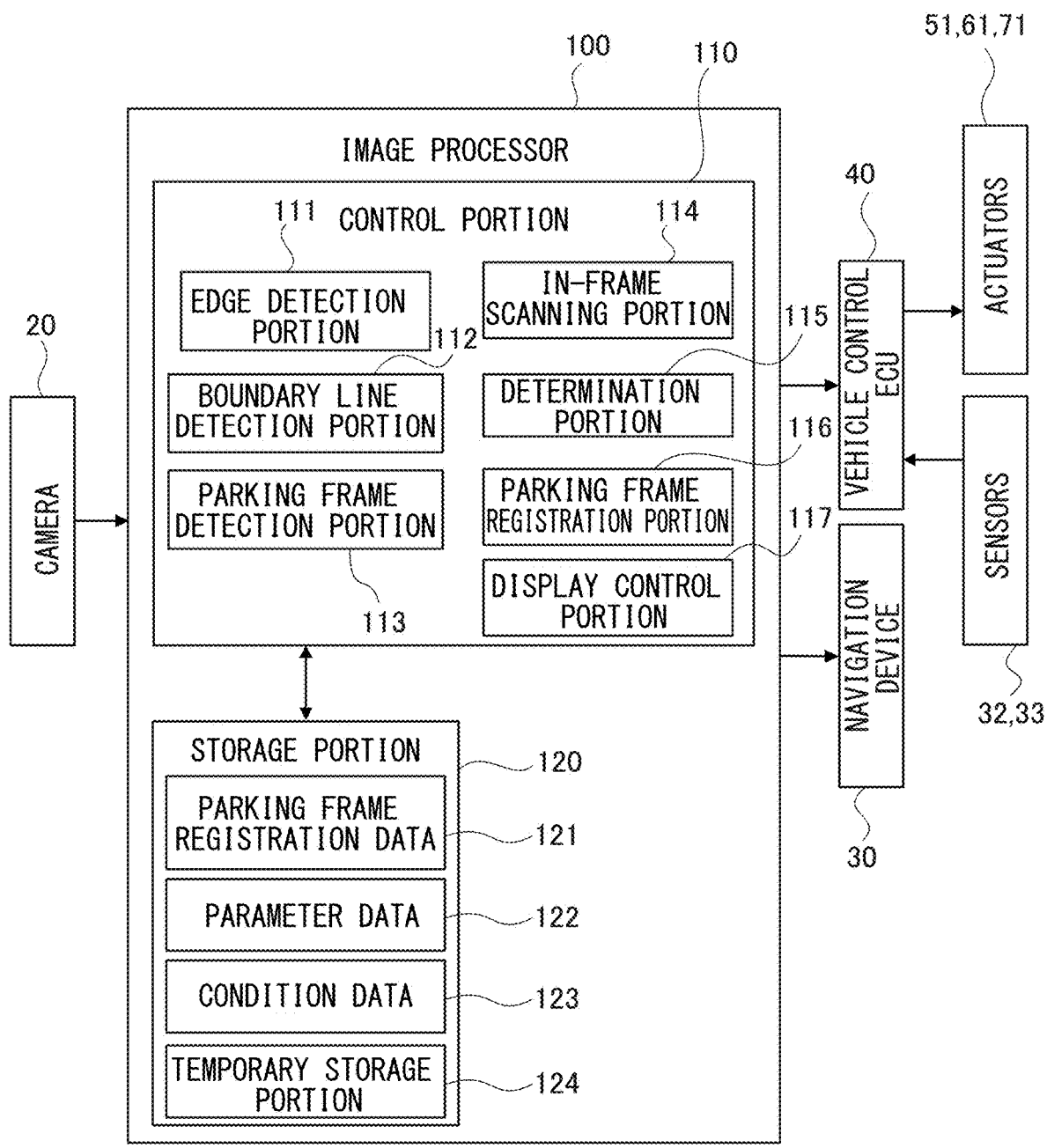
FIG. 3 is a functional block diagram illustrating a schematic configuration of the image processor of the embodiment.

The functional configuration of the image processor will be described hereinafter. FIG. 3 is a functional block diagram illustrating a schematic configuration of the image processor 100 of the embodiment. The image processor 100 of the embodiment includes a control portion 110 and a storage portion 120. The control portion 110 is mainly constituted by the CPU of the camera ECU 21. The storage portion 120 is mainly constituted by the ROM, the RAM, the flash storage portion, and the like (i.e., the memory) of the camera ECU 21.

The control portion 110 controls the entire image processor 100. In addition, the control portion 110 transmits information (for example, positions, shapes, attributes of parking spaces and parking frames) required for the automatic parking process to the vehicle control ECU 40 so that the vehicle control ECU 40 executes the automatic parking process for automatically parking the vehicle V in the parking frame determined as an available parking frame based on the parking frame detected by a parking frame detection portion 113 or the attribute of the parking frame detected by an in-frame scanning portion 114 and a determination portion 115.

The vehicle control ECU 40 controls the power steering actuator 51, the throttle actuator 61, and the brake actuator 71 (simply recited as actuators in FIG. 3) based on the information provided from the control portion 110 and the information detected by the wheel speed sensor 32 and the steering angle sensor 33 (simply recited as sensors in FIG. 3).

The control portion 110 includes a calculation element represented by an integrated circuit such as a programable logic device and an ASIC. The programable logic device includes a CPU and an FPGA.

The storage portion 120 stores parking frame registration data 121, parameter data 122, and condition data 123. The parking frame registration data 121 relates to the positional data, attributes, and other information of the detected parking frame. The parameter data 122 relates to parameters to be used by the image processor 100. The condition data 123 relates to information regarding conditions for detecting the states of the edges and information linking the states of the edges to the attributes of the parking frames.

As shown in FIG. 11, the parameter data 122 includes data stored in a search parameter table 122a and a state determination parameter table 122b. The search parameter table 122a stores in advance parameters t1 to t3 to be used for scanning the inside of the parking frame. The parameter t1 is the threshold value of the brightness difference at the time of the edge detection. The parameter t2 is the minimum value of the line width consisting of the positive edge and the negative edge. The parameter t3 is the maximum value of the line width.

The state determination parameter table 122b stores in advance parameters s1 to s6 that are used to determine the attributes of the parking frames based on the states of the edges. The parameter s1 is an allowable range for the line width difference of the first parking prohibition marker. The parameter s2 is the number of lines detected on the search lines of the first parking prohibition marker. The parameter s3 is the number of lines detected on the search lines of the second parking prohibition marker. The parameter s4 is the number of lines detected on the search lines of the second and third parking prohibition markers. The parameter s5 is the minimum value of the line spacing of the first parking prohibition marker. The parameter s6 is an allowable range for the line spacing difference of the second and third parking prohibition markers. In this embodiment, numerical values suitable for the parking frames for parallel parking are stored as the parameters s1 to s6 but appropriate numerical values may be set in accordance with the parking styles or types of the parking frame. For example, in the case that the parking frames are set for perpendicular parking or angle parking, the numerical values may be stored suitably for the edge states of the markers on the perpendicular parking frame or the angle parking frame. Alternatively, the parameters s1 to s6 may be stored for each of the various parking types.

In addition to the above, the storage portion 120 may changeably store, as the parameter data 122, threshold values of color parameters or brightness used upon scanning the edges of the boundary lines, the reference length of the boundary lines, the widths of the parking spaces and threshold value thereof, or the like. Further, various parameters used by the image processor 100 such as the width of the boundary lines, the extending angles of the boundary lines, and the like may be changeably stored. Also, it is possible to adopt a configuration that stores a plurality of parameters and selects appropriate parameters depending on areas and/or countries where the parking assist device 1 is used, shapes and/or sizes of the parking spaces (parking frames), or the like.

As shown in FIG. 11, the condition data 123 includes data stored in a condition data table 123a. In the condition data table 123a, conditional expressions that relate to a plurality of conditions are set for each of the markers. The conditions include the line width difference ΔL, the line number N, the line spacing difference ΔW, or the like. It should be noted that the conditional expressions may not be stored in the storage portion 120 as the condition data 123 but may be included in a program. In the example shown in FIG. 11, the conditional expressions for the first parking prohibition marker, the second parking prohibition marker, and the third parking prohibition marker are set in the condition data table 123a. However, the conditional expressions are not limited thereto. The conditional expressions for other markers such as the priority parking marker, the charger guiding marker or the like may be stored. The parameters used for the conditional expressions are selected from the parameters s1 to s6 in the state determination parameter table 122b of the parameter data 122. Accordingly, the image processor 100 of the present embodiment can be used to detect the parking types and attributes of the parking frames including the markers only by properly changing the state determination parameter table 122b depending on the states of the parking frames without changing the conditional expressions in the condition data table 123a.

The storage portion 120 stores a control program (not shown). This control program is executed by the control portion 110 at the startup of the image processor 100. The image processor 100 includes a functional configuration as illustrated in FIG. 3. In particular, it is preferable for the image processor 100 of the present embodiment to have a calculation element capable of calculating at high speed, for example, an FPGA since the image processor 100 executes a high-speed image process as described below.

As shown in FIG. 3, the control portion 110 includes an edge detection portion 111, a boundary line detection portion 112, the parking frame detection portion 113, the in-frame scanning portion 114, the determination portion 115, a parking frame registration portion 116, and the display control portion 117.

Figure 5:
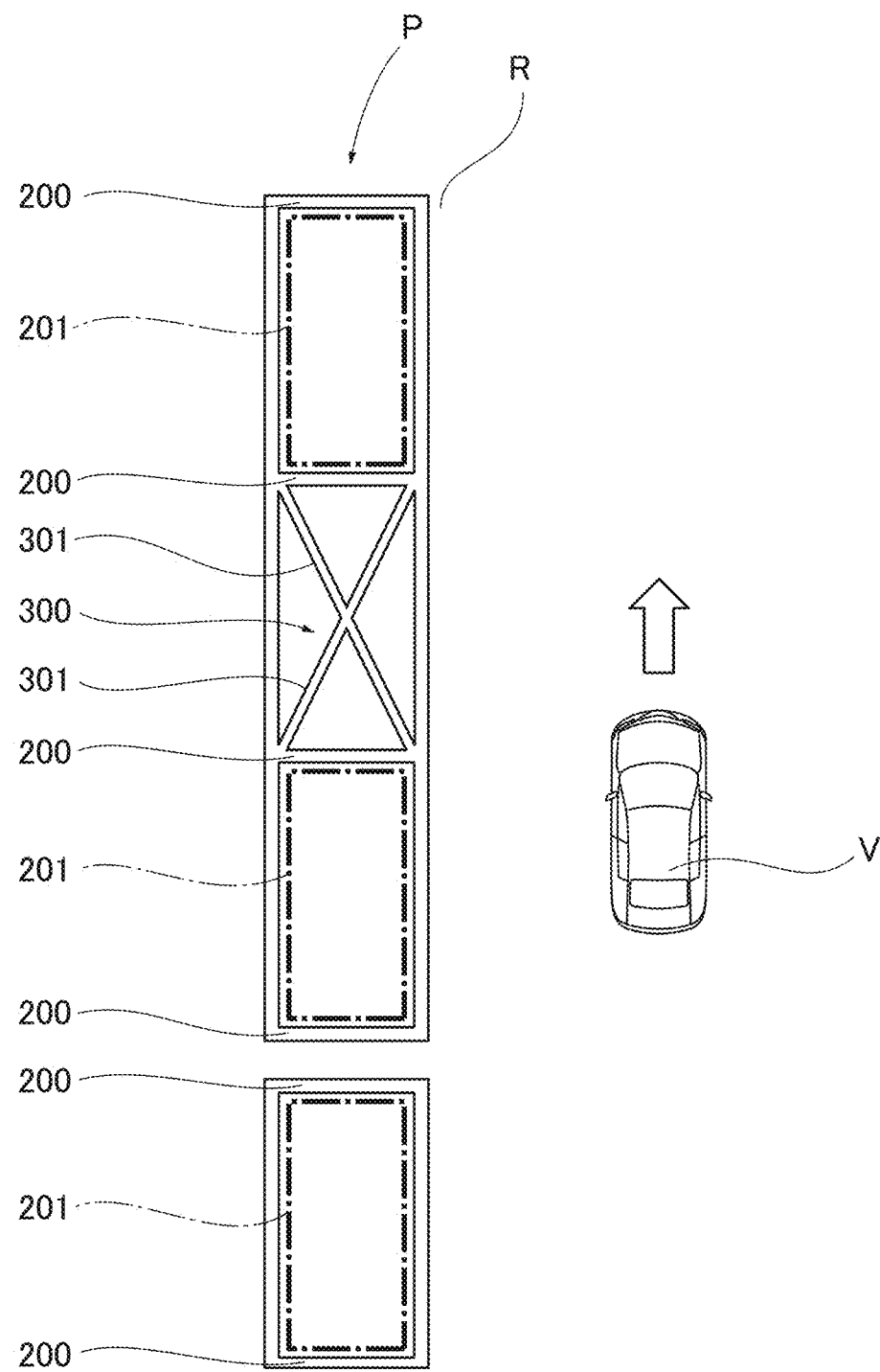
FIG. 5 is a view illustrating examples of a vehicle, boundary lines on a road surface of a parking lot, and a parking prohibition marker to describe an example of the operation of the image processor.

The edge detection portion 111 detects the edges of the boundary lines 200 provided on the road surface R of the parking lot P by the edge detection process based on the image signal output from the camera 20 that captures the road surface R around the vehicle V. The boundary lines 200 are provided or drawn as borderlines (straight lines) that define the parking areas on the road surface R. FIG. 5 illustrates an example of the vehicle V and the boundary lines 200 on the road surface R of the parking lot P for the vehicle V to be parked. Each of the parking frames 201 is defined between the boundary lines 200. In the example shown in FIG. 5, the boundary lines 200 are lines that define the parking frames 201 for parallel parking. FIG. 5 also illustrates a first parking prohibition marker 300. The first parking prohibition marker 300 indicates that an area including the marker 300 is a parking prohibition area.

Figure 6:
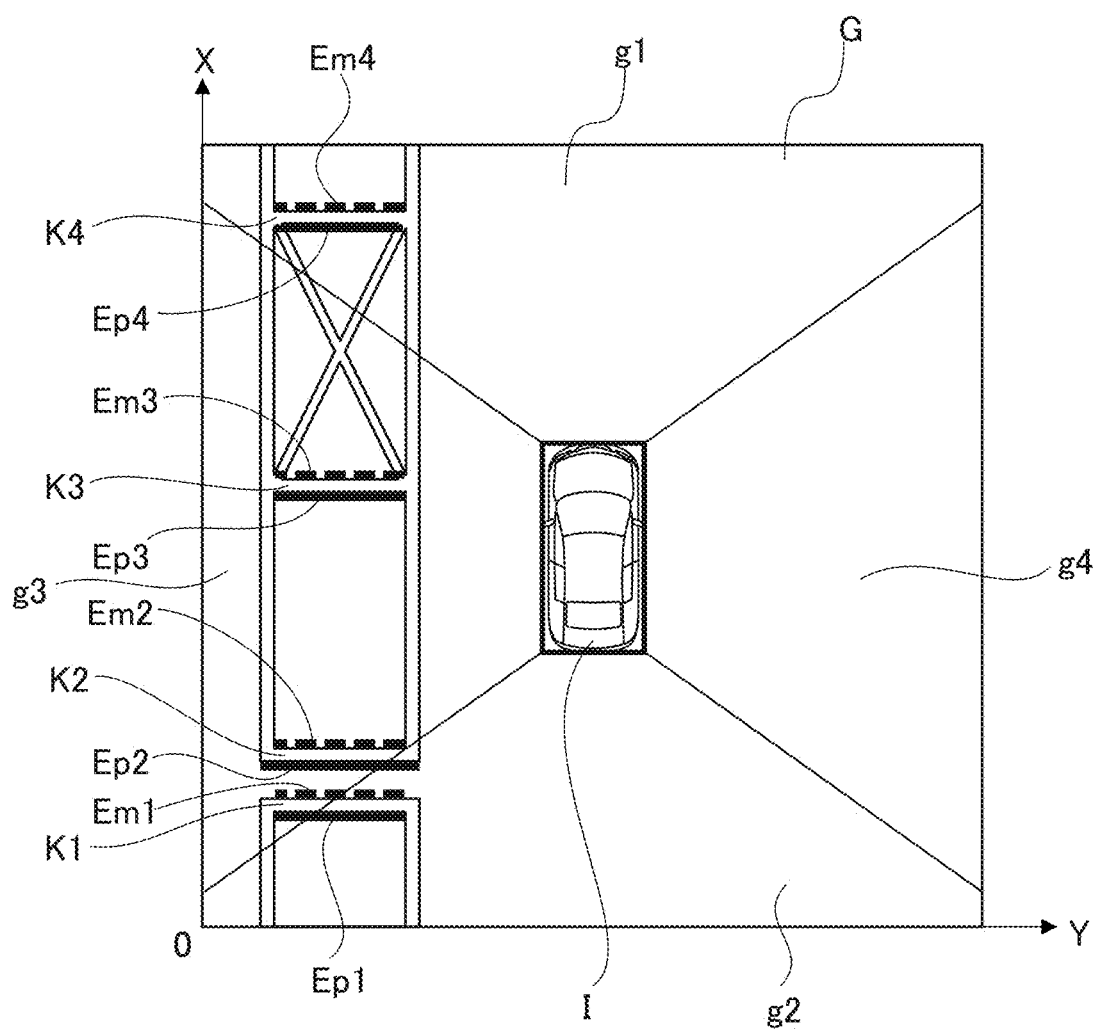
FIG. 6 is a view schematically illustrating line segments of detected edges on an overhead image to describe an example of the operation of the image processor.

FIG. 6 schematically illustrates an overhead image G generated by synthesizing signals of the image captured by the camera 20 and the edges detected from the overhead image G. The overhead image G shown in FIG. 6 is generated by converting the images based on the image signals of the images captured by the cameras 20a to 20d into overhead images g1 to g4, in which the vehicle V is viewed from the just above, and synthesizing the overhead images g1 to g4. An icon I is displayed in the center portion of the overhead image G. The icon I represents the vehicle V viewed from directly above.

The boundary lines 200 are generally in white, but may be in other colors such as yellow. Accordingly, the boundary lines 200 detected by the edge detection portion 111 are not limited to the white line. Generally, a borderline having a contrast with respect to the road surface R may be detected as the boundary lines 200.

The edge detection portion 111 scans the image in a predetermined direction. Then, the edge detection portion 111 detects pixels whose brightness values or color parameter data (e.g., RGB, RGBA, etc.) included in the image signal increase larger than a threshold and detects a portion in which the arrangement of the detected pixels has a given length or more as an edge. The scanning described herein is meant to select a pixel one by one in the predetermined direction, and compare the brightness values or the color parameters between the adjacent pixels. The detected edge is a positive edge or a negative edge depending on the direction or tendency of change of the brightness or color parameter.

It is preferable for the scanning direction to be set to the direction perpendicular to the boundary lines 200 on the road surface R. Specifically, as shown in FIG. 5, when the boundary lines 200 extend in the direction perpendicular to the traveling direction of the vehicle V (see arrow in FIG. 5), it is preferable to scan along the traveling direction of the vehicle V on the overhead image G (see FIG. 6). On the other hand, when the boundary lines 200 extend in the traveling direction of the vehicle V, it is preferable to scan in the direction perpendicular to the traveling direction of the vehicle V on the overhead image G. Generally, the extending directions of the boundary lines 200 are unknown. Accordingly, it is desirable for the edge detection portion 111 to scan twice in both the traveling direction of the vehicle V and the direction perpendicular to the traveling direction on the overhead image G.

In the case that the edge is extracted based on the brightness values, the edge detection portion 111 detects, as a positive edge (also referred to as rising edge), an edge changing from darker pixels with lower brightness (for example, black pixels) to brighter pixels with higher brightness (for example, white pixels) with the difference larger than a threshold, that is an edge in which difference of the brightness values between the adjacent pixels increases more than a predetermined value in the positive direction. The detection of the positive edge indicates that the scanning position is switched from the image of the road surface R to the image that is estimated as the boundary line 200.

In addition, the edge detection portion 111 detects, as the negative edge (also referred to as falling edge), an edge changing from the brighter pixels with higher brightness to the darker pixels with lower brightness with the difference larger than a threshold, that is an edge in which difference of the brightness values between the adjacent pixels increases more than a predetermined value in the negative direction. The detection of the negative edge indicates that the scanning position is switched from the image that is estimated as the boundary line 200 to the image of the road surface R.

On the other hand, in the case that the edge is extracted based on the color parameters, the color parameter of the road surface R image and the color parameter of the boundary line 200 image are compared. The edge detection portion 111 detects the pixel array in which the value of the color parameter is changed in the increasing direction (changed in negative direction) as the negative edge and the pixel array in which the value of the color parameter is changed in the decreasing direction (changed in positive direction) as the positive edge. When the brightness of the boundary line 200 image is lower than that of the road surface R image (or color parameter is larger), the changes in the brightness values and the color parameters are reversed. In any case, in the boundary line 200 image, the positive edge and the negative edge are detected on the first and second sides of the boundary line, which makes the pair extraction possible.

A line segment (pixel arrangement, pixel array) consisting of the consecutive positive edges in the direction crossing the scanning direction is detected as the line segment of the positive edge by repeating the above scanning for a plurality of lines. Also, a line segment (pixel array) constituted by the consecutive negative edges is detected as the line segment of the negative edge.

In the example shown in FIG. 6, the direction perpendicular to the extending direction of the boundary lines 200 along the traveling direction of the vehicle V on the overhead image G (vertical direction in FIG. 6) is represented with an X-axis while the extending direction of the boundary lines 200 (horizontal direction in FIG. 5B) is represented with a Y-axis. The edge detection portion 111 scans the overhead image G in the direction perpendicular to the traveling direction of the vehicle V toward the X-axis positive direction (from bottom to top in the drawing) to detect the positive and negative edges. When the overhead image G is scanned from top to bottom in the drawing, that is in the X-axis negative direction, the positive and negative edges are reversed. The positive and negative edges may be detected in accordance with data of the color parameters (e.g., RGB, RGBA, etc.) included in the image signal. In this case, the positive and negative edges may be detected based on changes in the magnitude (graduation, tone) of a given color.

The boundary line detection portion 112 detects the boundary lines based on the edges detected by the edge detection portion 111. More specifically, the boundary line detection portion 112 extracts, from the detected line segments of the positive and negative edges, the line segments of the positive and negative edges each of which has a length equal to or more than a predetermined reference length and extends in a predetermined direction (with a predetermined angle). The boundary line detection portion 112 does not extract the line segments of the positive and negative edges which are shorter than the reference length and/or extend in directions other than the vertical direction. Thereby, the edges caused by the light reflection on the road surface R, the waste, and the stain are eliminated as noise.

The reference length may be set to have a length equal to or more than the vehicle width (e.g., 2 m to 3 m) in the case of the boundary line 200 that defines the parking frame for parallel parking as shown in FIG. 5, for example. The reference length may be set to have a length equal to or more than the vehicle length (e.g., 5 m) in the case of the boundary line 200 that defines the parking frame for perpendicular parking. The reference length may be set to have a length shorter than the vehicle width or the vehicle length depending on the shooting range and/or the shooting conditions of the camera 20. The angle is set by considering the traveling direction of the vehicle V, the orientation of the camera 20 that captures images, and the like. In the case shown in FIG. 5, since each of the boundary lines 200 is a straight line extending perpendicular to the traveling direction, the angle is set to 90 degrees±a permissible error.

The boundary line detection portion 112 calculates the position information (coordinate values) of the start point and the finish point of each of the detected line segments of the negative and positive edges and extracts the line segments of the negative and positive edges that are adjacent to each other at a predetermined spacing based on this position information to determine them as a pair of edges that constitute the boundary line. For example, when the distance between the positive edge and the negative edge is within the line width of the boundary line±a permissible error, the positive and negative edges are determined as a pair of edges.

FIG. 6 schematically illustrates, on the overhead image G, the line segments Ep (thick solid lines) of the positive edges and the line segments Em (thick dashed lines) of the negative edges each of which extends with the length equal to or more than the extracted reference length and a predetermined angle. In the example shown in FIG. 6, a pair of line segments Ep, Em (i.e., Ep1 and Em 1, Ep2 and Em2, Ep3 and Em3 as well as Ep4 and Em4) of the positive and negative edges are extracted from respective sides of the image K (K1 to K4) of the boundary line 200. Specifically, the line segment Ep is extracted on the first side of the image K of the boundary line 200 and the line segment Em of the negative edge on the second side of the image K. Hereinafter, the image K of the boundary line is referred to as a "boundary line image K". In other words, the lines defined by these pairs of the line segments of the positive and negative edges are detected as the boundary line images K1 to K4.

The parking frame detection portion 113 detects the parking frame (parking space) on the overhead image G based on the edge pairs that define the boundary line images K (K1 to K4) detected by the boundary line detection portion 112. First, the parking frame detection portion 113 selects, from the plurality of pairs of line segments Ep, Em of the positive and negative edges, the line segments of two edges (i.e., positive and negative edges) that face each other and may define the parking space. The selected two line segments are lines that constitute the side edges of a pair of boundary line images K defining the parking space therebetween.

Then, the parking frame detection portion 113 calculates the distance (inner dimension between adjacent boundary line images K) between the selected line segments of the two edges based on the coordinate values of the endpoints of each edge and determines whether the calculated distance falls within a predetermined range or not. In the case that the distance falls within the predetermined parking space width±a permissible error, the area defined by the two line segments of the edges is determined as the parking space, and accordingly the frame that surrounds this parking space is determined as the parking frame. The parallel parking space for a middle-size vehicle, a small truck, or the like preferably has a width of 2 m to 3 m. The parallel parking space for a large truck, a bus, or the like preferably has a width of 10 m or more. The perpendicular parking space for the middle-size vehicle, the small truck, or the like preferably has a width of 2 m to 3 m. The perpendicular parking space for the large truck, the bus, or the like preferably has a width of 3.3 m or more.

The parking frame detection portion 113 temporarily stores the parking frame information of the detected parking frame in a temporary storage portion 124. It is preferable to use, as the parking frame information, the position information of the parking frame, for example, at least the coordinate values of the start points of the line segments Ep, Em of the positive and negative edges that face to define the parking frame, or more preferably the coordinate values of the start points and the finish points of the line segments Ep, Em. However, the parking frame information is not limited thereto.

Figure 7A:
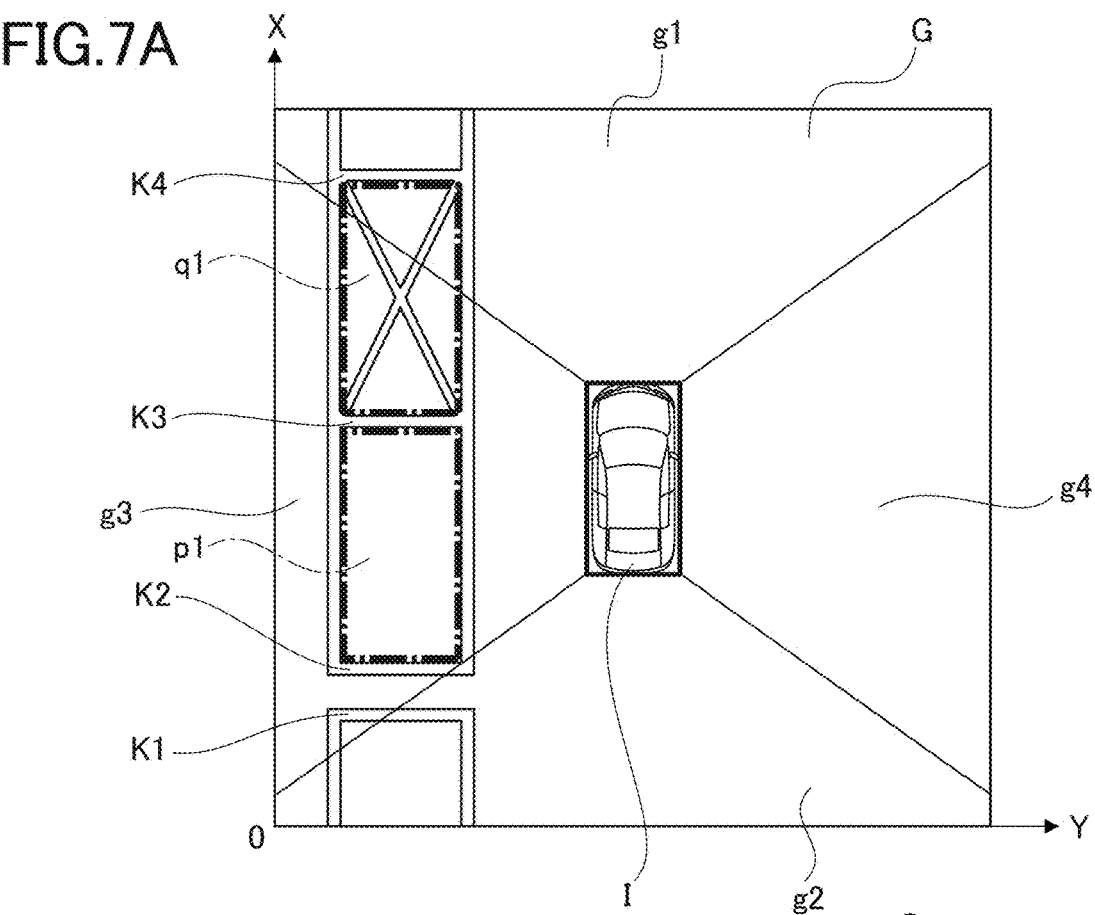
FIG. 7A is a view schematically illustrating a detected parking frame on the overhead image to describe an example of the operation of the image processor.

As shown with the virtual lines in FIG. 7A, a parking frame p1 is defined and detected between the boundary lines K2, K3 on the overhead image G. Also, a parking frame q1 is defined and detected between the boundary lines K3, K4 in the parking prohibition area on the overhead image G. In the case that the parking prohibition area is detected as the parking frame q1, the vehicle control ECU 40 that acquires the parking frame registration data 121 may use the parking frame q1 for the parking assist operation if any precaution is not taken.

In order to prevent the parking frame q1 from being used for the parking assist operation, the image processor 100 of the present embodiment determines the attributes (parking frames, parking prohibition area, etc.) of the detected parking frames p1, q1. Specifically, the in-frame scanning portion 114 scans the parking frame and detects the edges, and the determination portion 115 determines the attributes (or types) of the parking frame or parking space based on the states of detected edges.

The attributes include the parking frame, the parking prohibition area, the priority parking frame, the electric vehicle parking frame, and the like, for example. However, the attributes are not limited thereto. The parking frame is a frame where any types of the vehicle V can be parked or a frame that can be used anybody. This parking frame does not include a special marker (other than markers showing parking numbers, etc.) provided or painted within the area (parking space) defined by the boundary lines 200 or surrounded by the square frame including the boundary lines 200 as the parking frame 201 shown in FIG. 5, for example. On the other hand, the parking prohibition area is an area that prohibits entering or parking of the vehicle V and includes a predetermined parking prohibition marker (e.g., first parking prohibition marker 300 shown in FIG. 5, etc.) provided or painted within the area.

The priority parking frame (also referred to as "parking spaces for people with disabilities", etc.) is a parking frame where wheelchair users, people with disabilities, pregnant women, the elderly, and the like can park the vehicle with priority. The priority parking frame includes the priority parking marker (e.g., priority parking marker 330 shown in FIG. 12, which is referred to as "markers for people with disabilities", etc.). In addition, the priority parking frame includes a parking frame for a compact vehicle with a compact vehicle priority marker, a parking frame for a freight vehicle or truck with a freight vehicle or truck priority marker, and the like. The electric vehicle parking frame is a parking frame where the electric vehicle is parked and charged. The electric vehicle parking frame includes the charger guiding marker (e.g., charger guiding marker 340 shown in FIG. 12) indicating that there is a battery charger.

In the present embodiment, the determination portion 115 determines whether the attribute is the parking prohibition area or an available parking frame. Specifically, the available parking frame is determined simply as the parking frame without distinguishing the parking frame for any vehicles V, the priority parking frame, and the electric vehicle parking frame.

The sections (a) and (b) of FIG. 8 illustrate examples of the parking prohibition markers. The first to third parking prohibition markers 300, 300A, and 300B shown in FIG. 8 include a rectangular boundary portion 303 and a diagonal line portion 305 provided within the boundary portion 303. The boundary portion 303 includes two short sides 301 and two long sides 302 which are disposed to surround the parking prohibition area. The diagonal line portion 305 includes diagonal lines 304. The diagonal line portion 305 of the first parking prohibition marker 300 shown in the section (a) of FIG. 8 includes two diagonal lines 304 intersecting in an X-shape. The diagonal line portion 305 of the second parking prohibition marker 300A shown in the section (b) of FIG. 8 includes a plurality of diagonal lines 304 parallel to each other. The diagonal line portion 305 of the third parking prohibition marker 300B shown in the section (c) of FIG. 8 includes a plurality of diagonal lines 304 disposed in a zig-zag shape (W-shape).

In the parking prohibition markers 300 to 300B, the two short sides 301 are used as the boundary lines 200 in the case of the parallel parking while the two long sides 302 are used as the boundary lines 200 in the case of the perpendicular parking. The parking prohibition markers are not limited to the above examples and any marker may be used as long as the marker can prohibit the entering or parking of the vehicle V. In the examples shown in the sections (a) and (b) of FIG. 8, the boundary portion 303 is rectangular with the two short sides 301 and the two long sides 302 but not limited thereto. For example, the boundary portion 303 may include the two short sides 301 or the two long sides 302.

Hereinafter, the processes by the in-frame scanning portion 114 and the determination portion 115 according to the present embodiment will be described in detail. First, the in-frame scanning portion 114 sets one or more lines to be scanned (referred to as "search line(s)" hereinafter) for scanning the inside of the parking frame. A procedure for setting the search line will be described with reference to FIG. 9. FIG. 9 illustrates an example for scanning the parking frame including the first parking prohibition marker (i.e., parking prohibition area). As shown in FIG. 9, the in-frame scanning portion 114 sets the line segment Ep of the positive edge and the line segment Em of the negative edge that are two facing sides of the two boundary line images K that face each other to define the parking frame, as a first line segment L1 and a second line segment L2, respectively. The in-frame scanning portion 114 acquires dividing points that divide the first and second line segments L1, L2 at a predetermined rate. In the example shown in FIG. 9, the in-frame scanning portion 114 divides the first and second line segments L1, L2 at a rate of 25% (¼) respectively and acquires four dividing points located 25% from each of the endpoint d1 to d4 of the line segments L1, L2. These four dividing points are set as search points D1 to D4. Then, the in-frame scanning portion 114 calculates the position coordinates of these search points D1 to D4 on the overhead image G.

In the present embodiment, the line segments are divided at a rate of 25% but not limited thereto. However, the dividing rate may be appropriately set depending on the aspect rate of the rectangular parking frame, the types of the parking prohibition markers, the shooting range and resolution of the camera 20, or the like. Also, the dividing rate may be changeably stored in the storage portion 120 as the parameter data 122.

Then, the in-frame scanning portion 114 connects the search points D1 and D2 facing each other in a direction crossing the boundary line images K to set a search line TL1. Similarly, the in-frame scanning portion 114 connects search points D3 and D4 facing each other in a direction crossing the boundary line images K to set a search line TL2. A first side where the search points D1, D3 are located is set as a "start side" from which the scanning starts while a second side where the search points D2, D4 are located is set as a "finish side" at which the scanning ends. Only one search line may be set. However, providing a plurality of search lines and scanning a plurality of locations can improve the accuracy of detection of the edge states even when the lines of the marker have a blur or a shadow. Providing the two search lines TL1, TL2 as the present embodiment can improve the accuracy of detection of the edge states and make it possible to detect the edges with excellent calculation efficiency and robustness.

Next, the in-frame scanning portion 114 scans the image from the start side to the finish side along the search lines TL1, TL2 to detect the positive edge and the negative edge. At this time, a portion where the brightness (or color parameter) of adjacent pixels changes in the positive direction more than the threshold value is detected as the positive edge while a portion where the brightness (or color parameter) of adjacent pixels changes in the negative direction more than the threshold value is detected as the negative edge.

The storage portion 120 stores the threshold values as the parameter t1 in the search parameter table 122a of the parameter data 122. In the present embodiment, the parameter t1, which is the threshold values of the brightness difference, is set to 90 [pix] (i.e., t1=90 [pix]) and stored in the search parameter table 122a, for example. However, the parameter is not limited to the above value and the brightness difference. FIG. 9 illustrates the scanning image of the search line TL1, as well as the images of the positive edge and the negative edge detected by scanning. Portions between the positive edge and the negative edge are estimated as lines of the marker.

Then, the in-frame scanning portion 114 determines the distance between the detected positive and negative edges. Specifically, the in-frame scanning portion 114 determines whether or not the line width of the portion estimated as the marker is within an allowable range for the line representing the marker with regard to the detected positive and negative edges. In the case that the line width is within the allowable range, the in-frame scanning portion 114 determines the positive and negative edges as the available edges. On the other hand, in the case that the line width is not within the allowable range, the in-frame scanning portion 114 discards the positive and negative edges. The allowable range is between the parameter t2 and the parameter t3 stored in the search parameter table 122a. In the present embodiment, the parameter t2 is set to 5 [pix] (i.e., t2=5 [pix]) and the parameter t3 is set to 23 [pix] (i.e., t3=23 [pix]), for example. Setting the allowable range for the line width to 5 to 23 [pix] can appropriately detect the portions of the marker regardless of the line width and shape of the marker, the distortion of the overhead image G, and the like. It should be noted that the parameters t2, t3 are not limited to the above values and may be set as desired.

The determination portion 115 determines whether or not the states of the positive and negative edges detected by the in-frame scanning portion 114 fulfill the conditional expressions in the condition data table 123a. A specific example of the determination procedure will be described with reference to the explanatory views of FIGS. 9, 10 and the data structure of the parameter data of FIG. 11.

Figure 10:
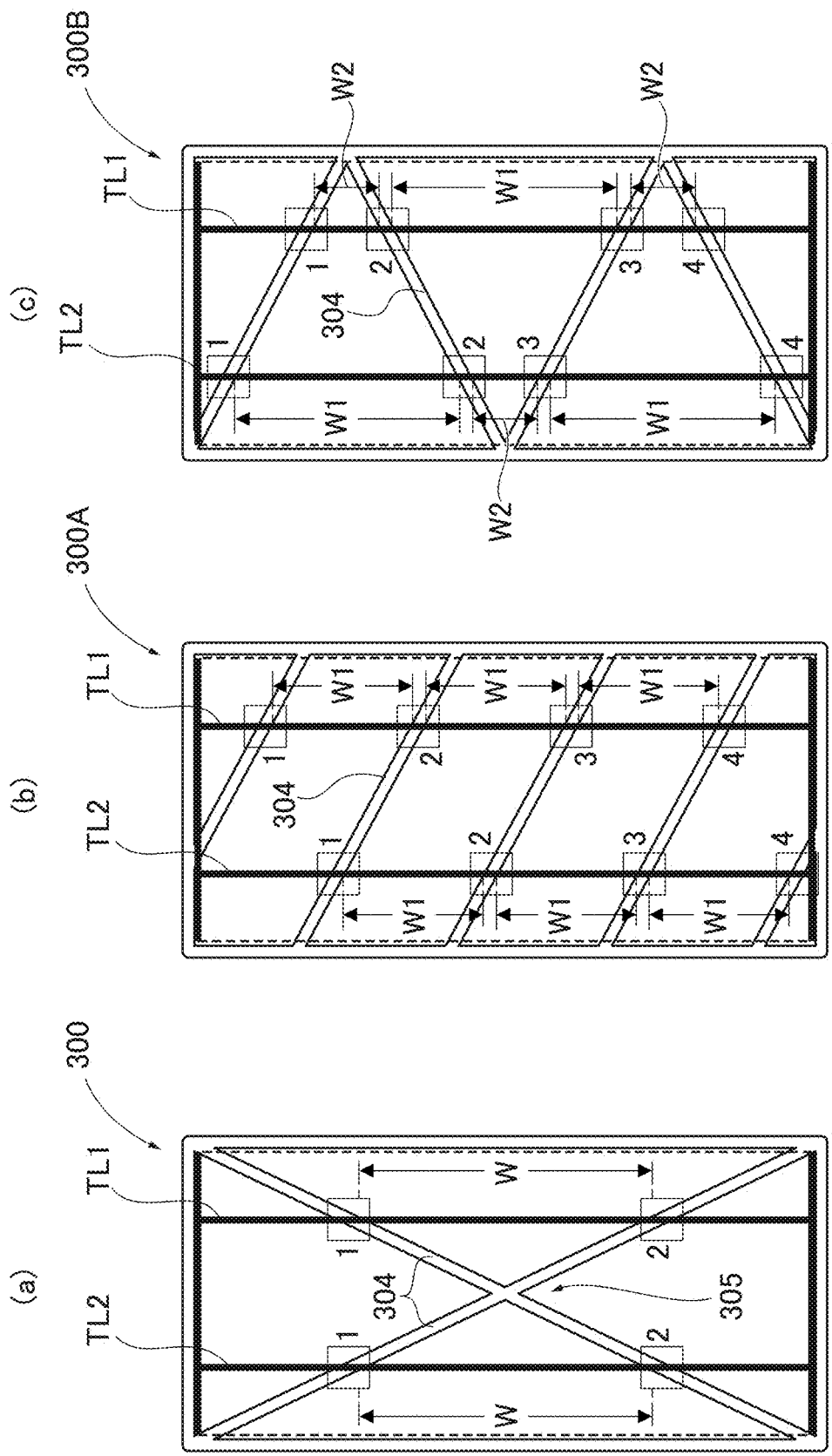
FIG. 10 is a view illustrating a process for determining the parking prohibition marker by a determination portion to describe an example of the operation of the image processor.

In the case that the states of the edges fulfill the following conditional expressions (see FIG. 11), the determination portion 115 determines that the attribute of the parking frame is the parking prohibition area (see (a) of FIG. 10) including the first parking prohibition marker 300:

the line width difference ΔL is equal to or more than an allowable pretrained value (ΔL≥s1; e.g., s1=6 [pix]) (i.e., the line width difference ΔL is within the allowable range);

the line number N is equal to the predetermined number (N=s2; e.g., s2=2 [lines]);

the line spacing W is more than the minimum line spacing (W>s5; e.g., s5=38 [pix]).

The line width difference ΔL is the difference between line widths L of the adjacent lines detected on the search line. As shown in FIG. 9, the line width L is a distance between the positive edge and the negative edge. The section (a) of FIG. 10 illustrates the detected lines with squares. For example, as shown in the section (a) of FIG. 10, the line width difference ΔL is the difference between the line width L of the first line (e.g., shown with square 1) and the line width L of the second line (e.g., shown with square 2). The line number N is the number of the lines (diagonal lines) detected on the search lines TL1, TL2. In the case of the first parking prohibition marker 300 shown in the section (a) of FIG. 10, two lines are detected on each of the search lines TL1, TL2. The line spacing W is a spacing between the adjacent detected lines (more specifically, spacing between the negative edge of one line and the positive edge of the other line) as shown with arrows in the section (a) of FIG. 10.

In the case that the states of the edges fulfill the following conditional expressions, the determination portion 115 determines the attribute of the parking frame is the parking prohibition area (see (b) of FIG. 10) including the second parking prohibition marker 300A:

the line number N is equal to the predetermined number (N=s2 or s3; e.g., s2=3 [lines], s3=4 [lines]);

the line spacing difference ΔW is less than an allowable pretrained value (i.e., the line spacing difference ΔW is within the allowable range) (ΔW<s6; e.g., s6=3 [pix]).

The second parking prohibition marker 300A includes a plurality of diagonal lines 304 parallel to each other. Accordingly, a plurality of lines (e.g., three or four) is detected on each of the search lines TL1, TL2. The line spacings of the diagonal lines 304 are substantially evenly spaced. Accordingly, the line spacings W1 detected on the search lines TL1, TL2 are substantially evenly spaced and the line spacing difference ΔW is relatively small (e.g., less than 3 [pix]).

In the case that the states of the edges fulfill the following conditional expressions, the determination portion 115 determines the attribute of the parking frame is the parking prohibition area including the third parking prohibition marker 300B (see (c) of FIG. 10):

the line number N is equal to the predetermined number (N=s4; e.g., s4=4 [lines]);

the line spacing difference ΔW is equal to or more than an allowable pretrained value (i.e., the line spacing difference ΔW is within the allowable range) (ΔW>s6; e.g., s6=3 [pix]).

The third parking prohibition marker 300B includes the diagonal lines 304 provided in a zig-zag shape (W-shape). Accordingly, a plurality of lines (four lines) is detected on each of the search lines TL1, TL2. The wider line spacing W1 and the narrower line spacing W2 are alternately detected on each of the search lines TL1, TL2 on the image. Accordingly, the line spacing difference ΔW between the adjacent line spacings is wider than one in the second parking prohibition marker 300A (equal to or more than 3 [pix]).

In the case that none of the conditions in the condition data table 123a is fulfilled, the determination portion 115 determines the attribute of the parking frame is an available parking frame where the vehicle V can be parked. The lines of the markers (e.g., priority parking marker, etc.) other than the parking prohibition markers 300, 300A, 300B do not fulfill the above conditions. Accordingly, the parking frame including such a marker is determined as "the parking frame". Also, it is possible to store the conditions of other markers such as the priority parking marker in the condition data table 123a and the determination portion 115 may determine whether the conditions are fulfilled or not and determines the attribute of the parking frame (e.g., priority parking frame, electric vehicle parking frame, etc.) based on the determination result.

In the case that the attribute of the parking frame is "the parking prohibition area", the determination portion 115 deletes, from the storage portion 120, the parking frame information which is temporarily stored in the temporary storage portion 124 by the parking frame detection portion 113. However, the deletion process is not limited to the above. Alternatively, a flag area may be provided in the storage area of the parking frame registration data 121 of the storage portion 120 in addition to the area for storing the position information and the like. When the determination portion 115 determines that the parking frame is the available parking frame, the flag area may be left in the initial state (i.e., flag off). On the other hand, when the determination portion 115 determines that the parking frame is the parking prohibition area, the flag may be turned on.

The parking frame registration portion 116 registers the parking frame information that has been temporarily stored in the temporary storage portion 124 in the storage portion 120 as the parking frame registration data 121. The parking frame registration data 121 stored in the storage portion 120 is transmitted to the vehicle control ECU 40 to be used for the parking assist operation. On the other hand, in case that "the parking prohibition area" is determined, the parking frame information detected by the parking prohibition area is not stored in the storage area of the parking frame registration data 121 in the storage portion 120 since the parking frame information has been deleted from the temporary storage portion 124. Accordingly, it is possible to prevent the vehicle control ECU 40 from recognizing the parking prohibition area as the parking frame.

In the configuration where the determination portion 115 does not delete the parking frame information of the parking prohibition area but turns on the flag in the flag area, the parking frame registration portion 116 refers to the flag area and stores the information of the parking frame whose flag is turned off (i.e., the parking frame is determined as the parking frame where the vehicle V can be parked) as the parking frame registration data 121 in the storage portion 120. On the other hand, in the case of the parking frame whose flag is turned on (i.e., the parking frame is determined as the parking prohibition area), the parking frame registration portion 116 does not store the parking frame registration data 121 of the parking frame in the storage portion 120. Alternatively, the parking frame registration portion 116 may register the parking frame information of the available parking frame and the parking frame of the parking prohibition area. At this time, the attribute of each of the parking frames may be stored in the storage portion 120 together with the parking frame registration data 121.

The display control portion 117 transmits the display control signal for displaying images on the monitor 31 to the navigation device 30 and controls the monitor 31. Specifically, the display control portion 117 transmits a display control signal for displaying the images of the road surface around the vehicle V captured by the camera 20 or the overhead image G generated by synthesizing these images on the monitor 31. Also, the display control portion 117 may transmit a display control signal for superimposing and displaying an identifier that represents the parking frame determined as the parking frame by the determination portion 115 on the road surface images or the overhead image G. In addition, the display control portion 117 may transmit a display control signal for superimposing and displaying an identifier that represents the parking prohibition area on the road surface images or the overhead image G.

Figure 7B:
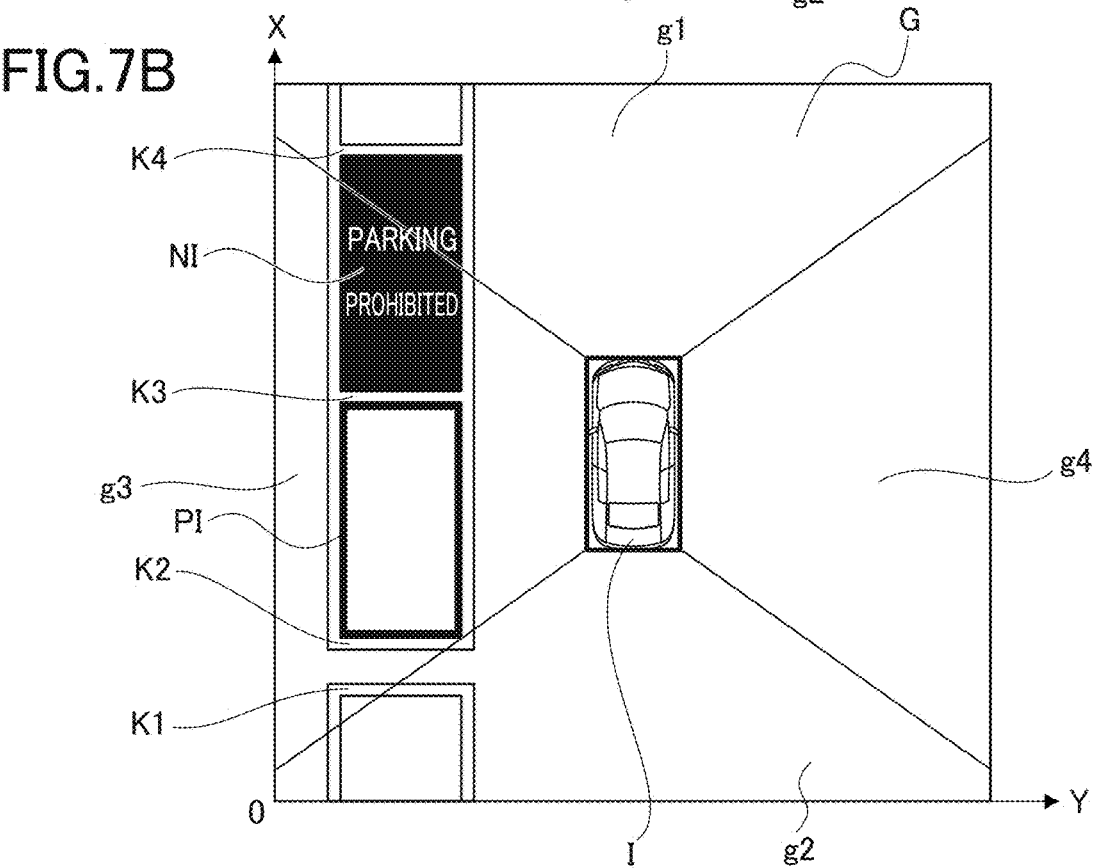
FIG. 7B is a view schematically illustrating a parking frame icon and a parking prohibition icon superimposed on the overhead image to describe an example of the operation of the image processor of another embodiment.

FIG. 7B illustrates an example in which a parking frame icon P1 and a parking prohibition icon N1 are superimposed as identifiers on the overhead image G displayed on the monitor 31. With this image including these icons, a driver can recognize that the parking assist device 1 distinguishes the parking frame from the parking prohibition area and detects the parking frame, which gives the driver a sense of safety. It should be noted that the parking frame information of the parking prohibition area has been deleted in this embodiment, and accordingly, the parking prohibition icon N1 is not displayed on the overhead image G but only the parking frame icon P1 is displayed.

Next, an example of the operation of the image processor 100 according to the present embodiment will be described with reference to the flowchart shown in FIG. 4.

Figure 4:
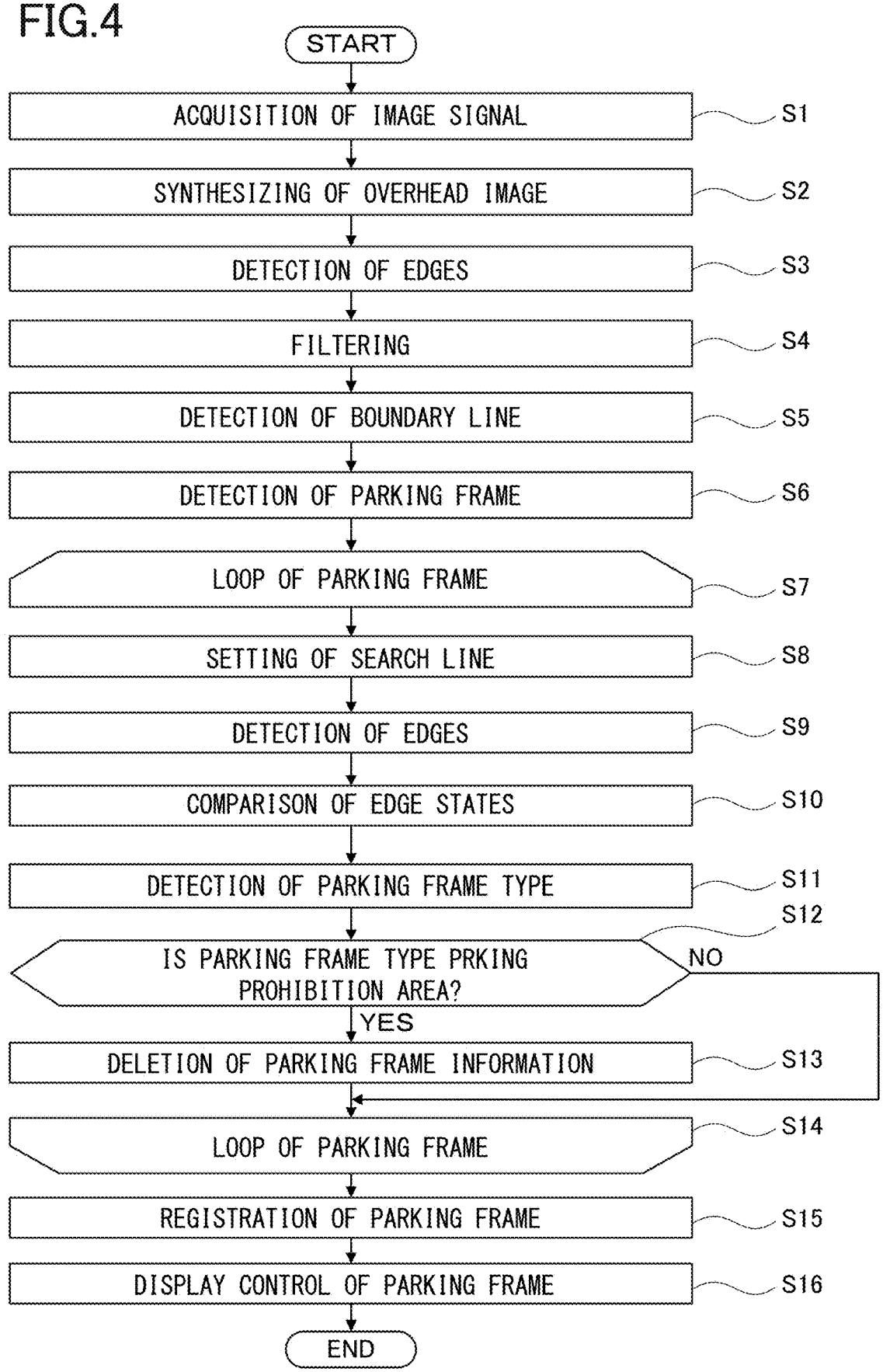
FIG. 4 is a flowchart describing an example of an operation of the image processor.

FIG. 4 shows a flowchart for describing the operation of the image processor 100. The operation in the flowchart shown in FIG. 4 starts when the driver inputs the automatic parking start instruction by pressing or touching the automatic parking start switch (not shown).

In Step S1, the control portion 110 of the image processor 100 acquires the signals of the images around the vehicle V captured by the camera 20.

In Step S2, the control portion 110 generates a signal by synthesizing the image signals acquired in Step S1. The generated signal in Step S2 is the signal for displaying, on the navigation device 30, an image as if a camera were installed above the vehicle V and looked down directly below (i.e., overhead image G). The generation of the overhead image is known in the art as disclosed in JPH03-99952A and JP2003-118522A, for example.

It should be noted that the image synthesizing process may not be executed in Step S2 or may be executed after the extraction of the positive and negative edges in Step S3. However, extracting the positive and negative edges after generating the overhead image G can reduce the processing load on the image processor 100.

In Step S3 (edge detection step), as described above, the edge detection portion 111 scans the overhead image G generated in Step S2 in a predetermined direction and extracts the positive and negative edges in the image based on the brightness included in the image signal.

In the example shown in FIG. 5, the edge detection portion 111 scans the overhead image G in the X-axis positive direction to detect the positive and negative edges in the image. Thereby, the line segments Ep (Ep 1 to Ep 4) of the positive edges shown with the thick solid line in FIG. 6 and the line segments Em (Em 1 to Em 4) of the negative edges shown with the thick dashed line are detected.

In Step S4, the edge detection portion 111 filters the line segments Ep of the positive edges and the line segments Em of the negative edges detected in Step S3 in accordance with the reference length as described above. Thereby, the short edges caused by the light reflection on the road surface, the waste, and the stain are eliminated as noise. The filtering may be performed after the extraction of pairs of edges in Step S5, but a high-speed image process can be achieved by eliminating the noise before the extraction of the pair of edges.

Next, in Step S5 (boundary line detection step), the boundary line detection portion 112 extracts pairs of the line segment Ep of the positive edge and the line segment Em of the negative edge adjacent to each other from the line segments of the edges detected in Step S4. At this time, the boundary line detection portion 112 calculates distances between the line segment Ep of the positive edge and the line segment Em of the negative edge adjacent to each other on the road surface based on the overhead image G and determines the edges as a pair of edges that defines or constitutes the boundary line if the distance falls within a predetermined line width±a permissible error. In the example shown in FIG. 6, the boundary lines (boundary line images K1 to K4) are detected between a pair of Ep1 and Em1, between a pair of Ep2 and Em2, between a pair of Ep3 and Em3, and between a pair of Ep4 and Em4, respectively.

In Step S6 (parking frame detection step), the parking frame detection portion 113 detects the parking frames and the parking spaces by the procedure described above based on the pairs of the line segments Ep of the positive edges and the line segments Em of the negative edges that define the boundary lines detected in Step S5. In the example shown in FIG. 7A, the parking frame p1 corresponding to the normal parking frame and the parking frame q1 corresponding to the parking prohibition area are detected. The parking frame detection portion 113 temporarily stores the position information (coordinate values of start points and/or finish points of edges) of the detected parking frames as the parking frame information in the temporary storage portion 124.

In the parking frame loop processing from Steps S7 to S14, the in-frame scanning portion 114 executes an in-frame scanning step for detecting the edges by scanning the detected parking frames and the determination portion 115 executes a detection step for detecting the attributes of the parking frames based on the states of the edges. The processing from Steps S7 to S14 is terminated when it is determined that the processing has already been performed for all of the parking frames detected in Step S6.

With regard to the in-frame scanning step, in Step S8 (search line setting step), the in-frame scanning portion 114 acquires the search points (dividing points) D1 to D4 that divide, at a predetermined rate, the facing line segments Ep, Em (line segments L1, L2) of the positive and negative edges of the boundary lines that face each other and define the parking frame to be processed as described above. Then, the in-frame scanning portion 114 sets the search line TL1 by connecting the facing search points D1 and D2 and also sets the search line TL2 by connecting the facing search points D3 and D4 (see FIG. 9).

In Step S9 (edge detection step), the in-frame scanning portion 114 scans the overhead image G along the search lines TL1, TL2 set in Step S8 and detects effective positive and negative edges based on the threshold value (t1) in the search parameter table 122a and the allowable values or allowable range of the line widths (t2 to t3).

With regard to the determination step, in Step S10 (edge state comparison step), the determination portion 115 compares the states of the positive and negative edges detected in Step S9 with the states of the edges based on the condition data stored in the condition data table 123a as described above. In Step S11, the determination portion 115 determines the attribute of the parking frame based on the comparison result. In the example shown in FIG. 7A, the parking frame p1 is determined as "the parking frame" since it does not fulfill any conditions. The parking frame q1 is determined as "the parking prohibition area" including the first parking prohibition marker 300.

In Step S12, the determination portion 115 determines whether the attribute of the parking frame is the parking prohibition area or not. In the case that the attribute of the parking frame is determined as the parking prohibition area (i.e., YES), the program proceeds to Step S13. In Step S13, the determination portion 115 deletes the information of the parking frame (parking frame q1 in FIG. 7A) from the temporary storage portion 124 and the program proceeds to Step S14. On the other hand, in the case that the attribute of the parking frame is not determined as the parking prohibition area (i.e., NO), the program skips Step S13 and proceeds to Step S14.

In Step S14, the control portion 110 determines whether there is another parking frame to be processed next. In the case that the control portion 110 determines that there is another parking frame to be processed, the program returns to Step S7 and the next parking frame is processed. In the case that the control portion 110 determines that there is no parking frame to be processed, the looping is terminated and the program proceeds to Step S15.

In Step S15 (parking frame registration step), the parking frame registration portion 116 registers, in the storage portion 120, the information about the parking frame (parking space) that has been registered in the temporary storage portion 124. Specifically, the parking frame registration portion 116 sets the coordinate values of the endpoints of the line segments of the positive and negative edges that face each other and define the parking frame to the coordinate values of the start points or finish points of the parking frame and registers these coordinate values in the storage portion 120 as the parking frame registration data 121. At this time, by registering the coordinate values of at least two start points of the parking frame, the parking frame can be identified while reducing the storage capacity as much as possible. Also, four coordinate values may be registered. In the example shown in FIG. 7A, only the parking frame information of the parking frame p1 is registered. On the other hand, in the case of the configuration that registers the attributes of the parking frames, the parking frame registration portion 116 may register, in the storage portion 120, the flag information (i.e., attributes) together with the parking frame registration data 121 or may store the parking frame information of the parking frame q1 in the storage portion 120. Also, the parking frame registration portion 116 may register the angles (and/or extending directions) of the boundary lines 200 and other information required for the automatic parking process together with the parking frame registration data 121.

In Step S16 (display control step), the display control portion 117 generates the display control signal for superimposing and displaying the parking frame icon P1 (see FIG. 7B) representing the parking frame registered in the storage portion 120 on the overhead image G. On the other hand, in the configuration that displays the parking prohibition icon N1 representing the parking prohibition area (see FIG. 7B), the display control signal including the parking prohibition icon N1 is generated. The display control portion 117 transmits the generated display control signal to the navigation device 30. Thereby, the monitor 31 displays the image in which the parking frame icon P1 (and the parking prohibition icon N1) is superimposed on the overhead image G as shown in FIG. 7B.

Also, the parking frame registration data 121 registered in the storage portion 120 is transmitted to the vehicle control ECU 40, and various processes for assisting the parking of the vehicle V are executed. At this time, in the configuration that also registers the flag information indicating the parking prohibition area together with the parking frame registration data 121, the vehicle control ECU 40 performs the parking assist operation depending on the attributes, for example, by displaying the identifier indicating the parking prohibition and/or referring to the flag information to eliminate the parking frame from the target parking frame.

In the image processor 100 of the present embodiment as configured above, the boundary line detection portion 112 detects the boundary lines (boundary line images K) from the image (overhead image G) based on the image signal acquired by the imaging device (camera 20) that captures the surrounding of the vehicle V (boundary line detection step). The parking frame detection portion 113 detects the parking frame (e.g., parking frames p1, p2) based on the detected boundary lines (parking frame detection step). The in-frame scanning portion 114 acquires the dividing points (search points D1 to D4) that divide, at a predetermined rate, a pair of sides (line segments L1, L2) of the boundary lines that define the parking frame and scans the image through the acquired dividing points to detect the edges (in-frame scanning step). The storage portion 120 stores the states of the edges and the attributes of the parking frame by linking them to each other (storing step). Then, the determination portion 115 determines the attribute of the parking frame by using the states of the detected edges and the attributes of the parking frame that correspond to the states of the edges and are stored in the storage portion 120 (determination step).

Thereby, it is possible to provide the image processor 100 and the image processing method that can appropriately detect the parking frame depending on the attribute of the parking frame. In addition, the inclusion of the image processor 100 or the image processing method makes it possible to provide the parking assist device 1 and the image processing method that can properly perform the parking assist operation depending on the attribute of the parking frame.

In the present embodiment, the in-frame scanning portion 114 detects, as the positive edges, portions in which the brightness of the adjacent pixels or the color parameters changes in the positive direction more than a predetermined value. Also, the in-frame scanning portion 114 detects, as the negative edges, portions in which the brightness of the adjacent pixels or the color parameters changes in the negative direction more than a predetermined value. The determination portion 115 compares the states of the positive and negative edges with the states of the edges set in advance for each of the attributes of the parking frames and determines the attribute of the parking frame based on the comparison result. Thereby, the image processor 100 can determine the attributes of the parking frames more appropriately and precisely.

Setting the states of the edges stored in the storage portion 120 and the attributes of the parking frames in accordance with the parking types or styles (e.g., parallel parking, perpendicular parking, angle parking, etc.) of the parking frames makes it possible to appropriately detect the attribution of the parking frame in accordance with the parking types or styles. Also, in the present embodiment, the state of the edge stored in the storage portion is the line width difference, the line number, the line spacing, or the line spacing difference with regard to the edges of the lines of the markers (e.g., parking prohibition markers 300 to 300B) provided in the parking frame in accordance with the attribute of the parking frame. Thereby, the various markers within the parking frames (e.g., parking prohibition marker, priority parking marker, charger guiding marker, etc.) can be detected more accurately, the variety of the attributes can be increased, and the processing can be performed more appropriately in accordance with the attributes.

In the case that the attribute of the parking frame is the parking frame in which any vehicle V can be parked, the parking prohibition area with the parking prohibition markers 300 to 300B, the priority parking frame with the priority parking marker 330, or the electric vehicle parking frame with the charger guiding marker 340, the parking assist operation or the like suitable for these attributes can be achieved. For example, in the case that the attribute is the parking prohibition area, this area is eliminated from the target parking frame. In the case that the attribute is the priority parking frame, this parking frame is set as the target parking frame only when the wheelchair user drives or rides the vehicle V. In the case that the attribute is the electric vehicle parking frame, this parking frame is set as the target parking frame only when the vehicle V is the electric vehicle.

Further, in the image processor 100 of the present embodiment, the in-frame scanning portion 114 acquires the dividing points (D1 to D4) that divide, at a predetermined rate, a pair of sides (line segments L1, L2) of the boundary lines that face each other to define the parking frame, and scans the image (the overhead image G) through the acquired dividing points to detect the edges. Thereby, the states of the edges can be detected with high accuracy, and the attributes can be appropriately determined with high accuracy even if the lines of the markers are interrupted by blurs or shadows.

In addition, the image processor 100 of the present embodiment includes the display control portion 117 that controls the display portion (or monitor 31) to superimpose and display the image (i.e., the overhead image G) and the identifiers (e.g., parking frame icon PI, parking prohibition icon NI) representing the attributes of the parking frames. Thereby, the driver can recognize the attribute of the parking frame by looking at the monitor 31. For example, the driver can recognize whether the attribute of the parking frame is the available parking frame or the parking prohibition area because of the image displayed on the monitor 31. In addition, the monitor 31 shows the driver that the parking assist operation is being performed properly, thereby the driver can feel safe and trust the device.

The embodiment of the present disclosure has been described in detail with reference to the drawings. However, the above embodiment is only an example of the present disclosure. The embodiment may be modified and/or changed without departing from the spirit of the present disclosure.

For example, in the above embodiment, the detection of the available parking frame for parallel parking and the parking prohibition area is described. As mentioned above, the image processor 100 of the present embodiment may be used to determine the attributes of the parking frames for perpendicular parking and angle parking as well as the parking spaces other than the parking prohibition area. FIG. 12 illustrates parking frames with various attributes and parking styles.

The section (a) of FIG. 12 illustrates an example of a parking lot for parallel parking which includes a priority parking frame with the priority parking marker 330. The section (b) of FIG. 12 illustrates an example of a parking lot for parallel parking which includes the electric vehicle parking frame with the charger guiding marker 340. The section (c) of FIG. 12 illustrates an example of a parking lot for perpendicular parking which includes the parking prohibition area with the first parking prohibition markers 300, the parking prohibition areas with the second parking prohibition markers 300A and the priority parking frame with the priority parking marker 330. The section (d) of FIG. 12 illustrates an example of a parking lot for angle parking which includes the parking prohibition area with the second parking prohibition marker 300A and the priority parking frame with the priority parking marker 330. The thin arrows shown in the sections (a) to (d) of FIG. 12 represent the search lines and the scanning directions when the in-frame scanning portion 114 scans the parking frames. The positions and numbers of the search lines as well as the conditions used to determine the states of the edges detected by scanning or the like are not limited to those described above and may be properly set in accordance with the attributes of the parking frames or parking spaces, the positions of the markers, the parking styles, or the like.

In the case that the parking lot includes the parking frames with various markers are detected as shown in FIG. 12, the determination portion 115 may set, to the flag area, data corresponding to the attributes of the parking frames, for example, "1" for the parking frame in which any types of the vehicle V can be parked, "2" for the parking prohibition area, "3" for the priority parking frame, "4" for the electric vehicle parking frame upon registering the parking frame information to the temporary storage portion 124, for example. Further, in the case of the parking prohibition areas, values may be set to distinguish the first to third parking prohibition markers 300 to 300B. Also, in the case of the priority parking frame, values may be set to distinguish the parking frames for people with disabilities, the parking frames for the compact vehicles, and the parking frames for the freight vehicle or truck.

In the case that the attribute of the parking frame is the parking prohibition area, upon registering the parking frame registration data 121 in the storage portion 120, the parking frame registration portion 116 may not register the parking frame information in the storage portion 120 or may store the parking frame information together with the flag information of the parking prohibition area in the storage portion 120. In the case that the attribute of the parking frame is the priority parking frame or the electric vehicle parking frame, the flag information corresponding to the attribute may be stored in the storage portion 120 together with the parking frame information. Thereby, the vehicle control ECU 40 selects the target parking frame based on the state (or types) of the vehicle V (e.g., the normal vehicle V, the vehicle V driven or ridden by the wheelchair user, etc.) and the attribute of the parking frame, so that the parking assist operation is performed appropriately.

In the above embodiment, the edges are detected based on the intensity and the direction (positive direction or negative direction) of the change in the color parameters (for example, RGB, RGBA) and the brightness of the image. However, the present disclosure is not limited to the above embodiment, and the edges may be detected based on the intensity and direction of the changes in other information included in the image signal.

What is claimed is:
1. An image processor comprising:
a microcomputer including a central processing unit and a memory, wherein the central processing unit is configured to:
detect a boundary line by using an image in accordance with an image signal acquired by an imaging device that captures a surrounding of a vehicle;

detect a parking frame by using the detected boundary line; and acquire a dividing point that divides, at a predetermined rate, a pair of facing sides of the boundary lines that define the parking frame and to scan the image through the acquired dividing point to detect an edge;

wherein the memory is configured to store a state of an edge and an attribute of the parking frame by linking them; and wherein the central processing unit is further configured to determine an attribute of the parking frame by using a state of the detected edge and the stored attribute of the parking frame that is linked to the state of the edge stored in the memory.

2. The image processor according to claim 1, wherein the state of the edge and the attribute of the parking frame that are stored in the memory are set in accordance with parking types of the parking frame.

3. The image processor according to claim 1, wherein the state of the edge stored in the memory is at least one of a line width difference, a line number, a line spacing, and/or a line spacing difference with regard to edges of lines of a marker provided in the parking frame in accordance with the attribute.

4. The image processor according to claim 1, wherein the attribute of the parking frame is a parking prohibition area, a priority parking frame, or an electric vehicle parking frame.

5. The image processor according to claim 1, wherein the central processing unit further configured to acquire a plurality of dividing points that divide, at a predetermined rate, a pair of facing sides of the boundary lines that define the parking frame and to scan the image through the acquired dividing points to detect the edge.

6. The image processor according to claim 1, wherein the central processing unit further configured to control a display to superimpose and display the image and an identifier that represents the attribute of the parking frame.

7. The image processor according to claim 1, wherein the central processing unit further configured to register position information of the detected parking frame and the determined attribute of the parking frame in the memory.

8. An image processing method comprising:

detecting a boundary line by using an image in accordance with an image signal acquired by an imaging device that captures a surrounding of a vehicle;

detecting a parking frame by using the detected boundary line;

acquiring a dividing point that divides, at a predetermined rate, a pair of facing sides of the boundary lines that define the parking frame and scanning the image through the acquired dividing point to detect an edge;

storing a state of an edge and an attribute of the parking frame by linking them; and determining an attribute of the parking frame by using a state of the detected edge and the stored attribute of the parking frame that is linked to the state of the edge stored in the storage portion.

\* \* \* \* \*